July 9, 1957
H. F. SILVER
2,798,711
APPARATUS FOR MINING COAL OR OTHER MINERALS FROM
THE SOLID WITH DEEPLY PENETRATING BITS
Filed Feb. 27, 1948
21 Sheets-Sheet 1
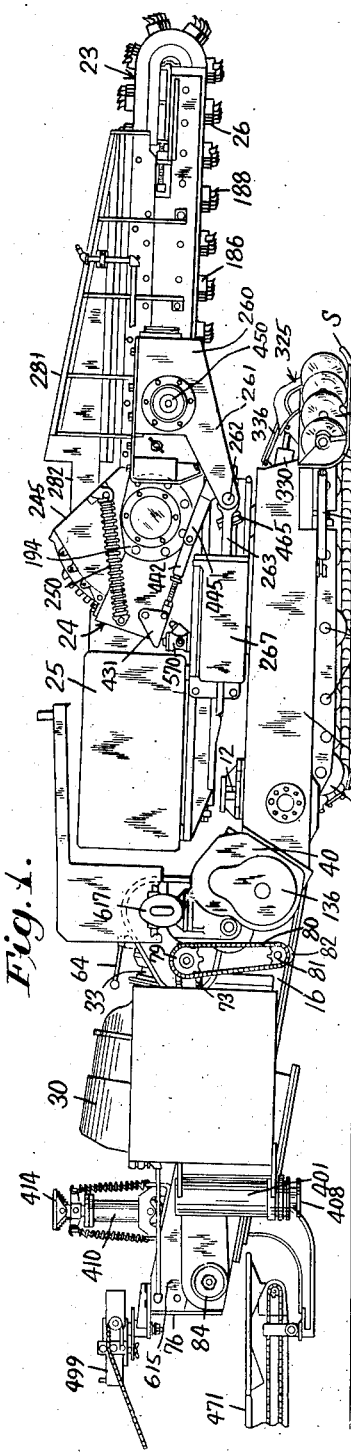
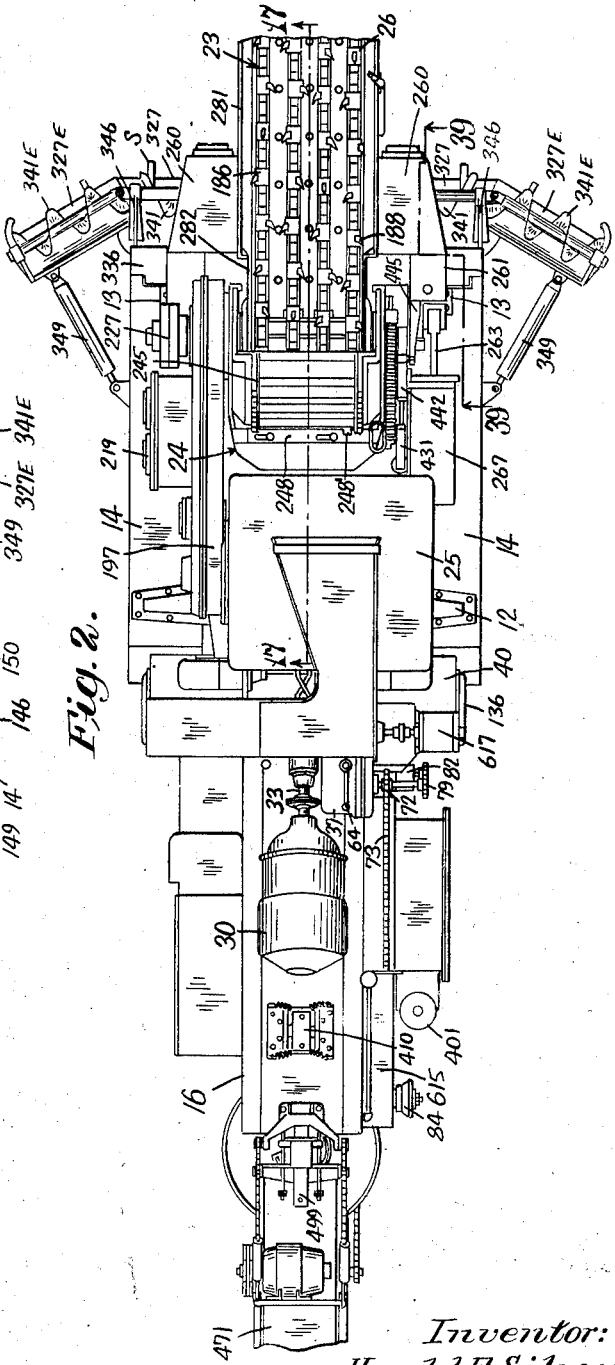
Inventor:
Harold F. Silver.
by
Atty.

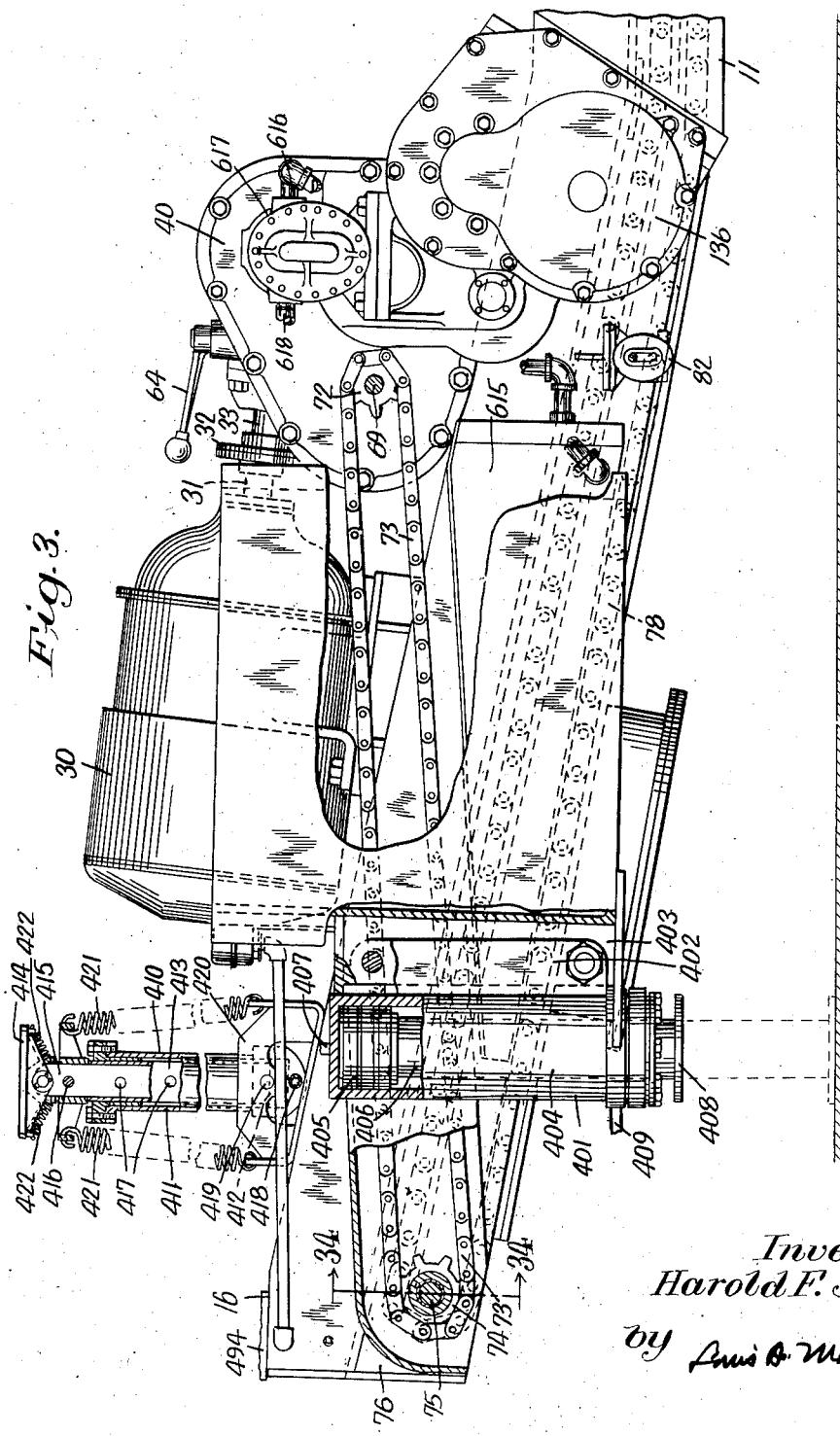

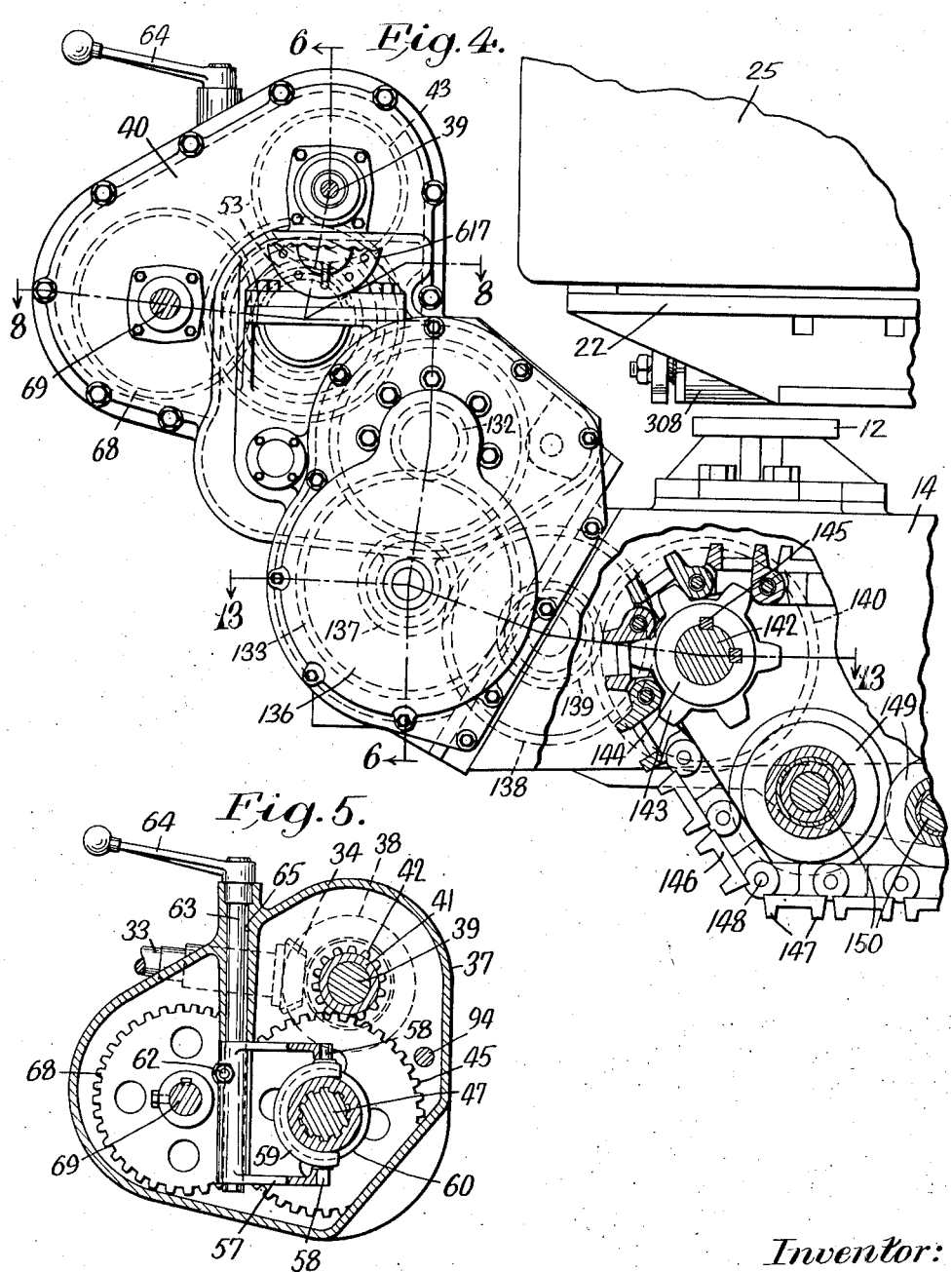

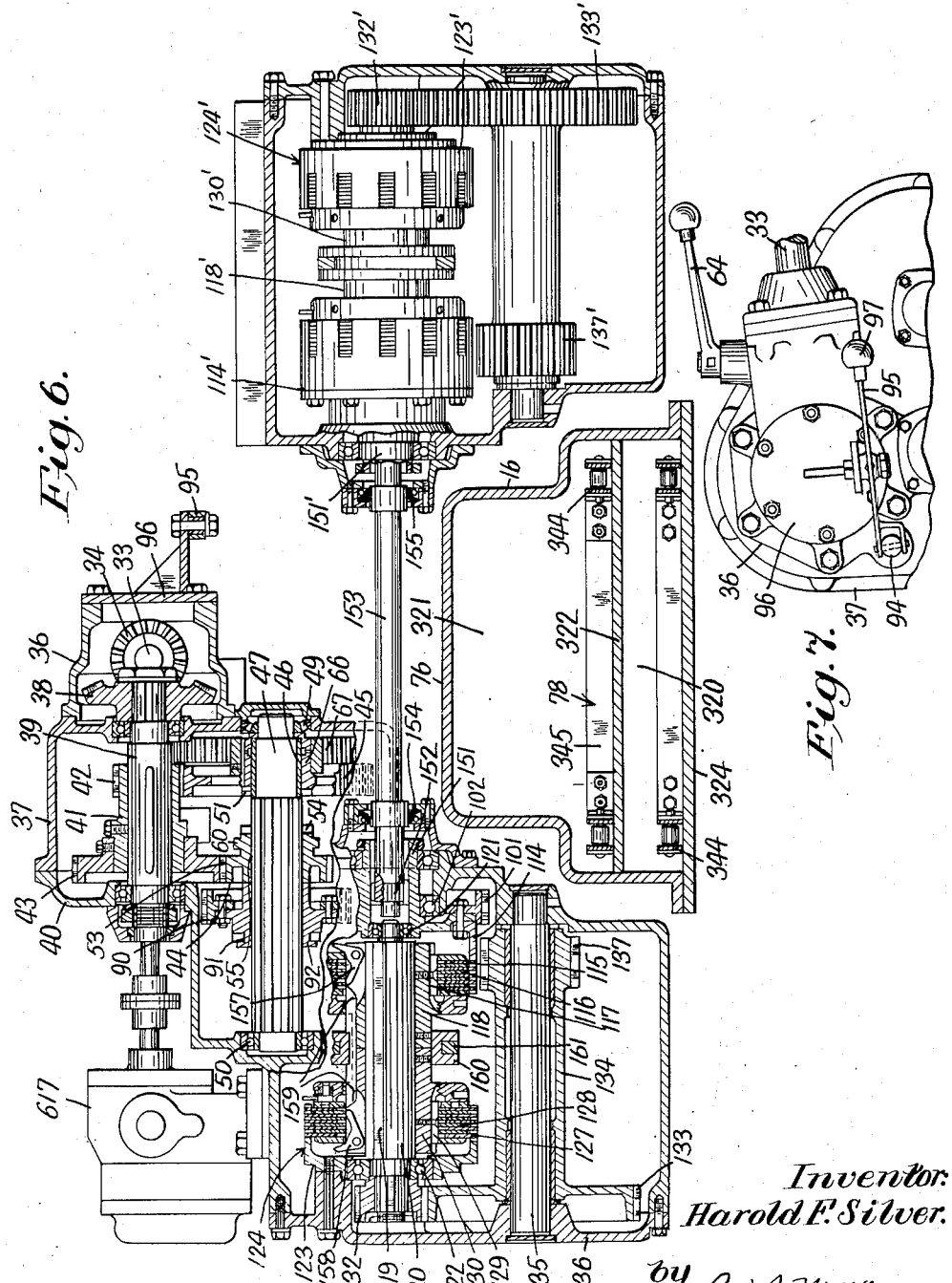

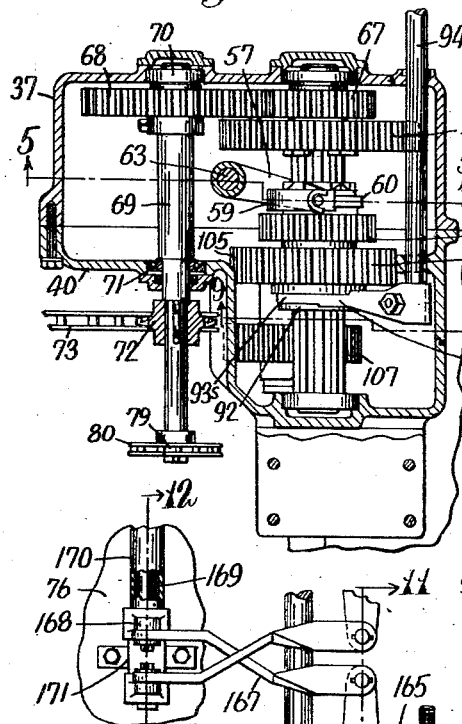

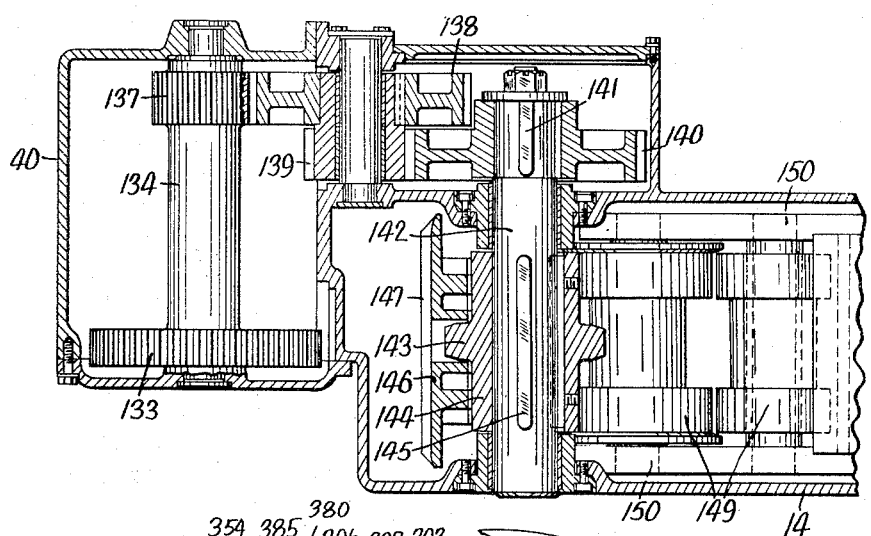
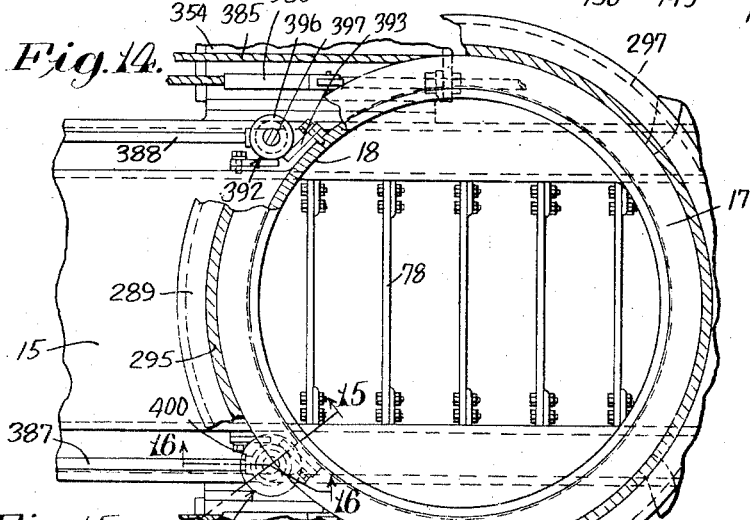
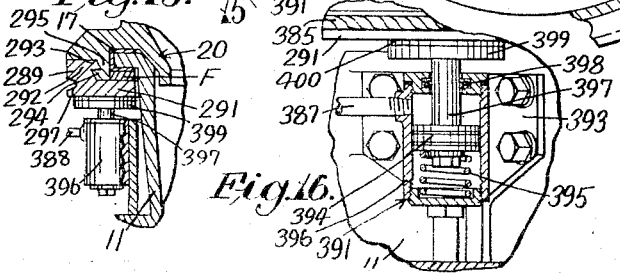

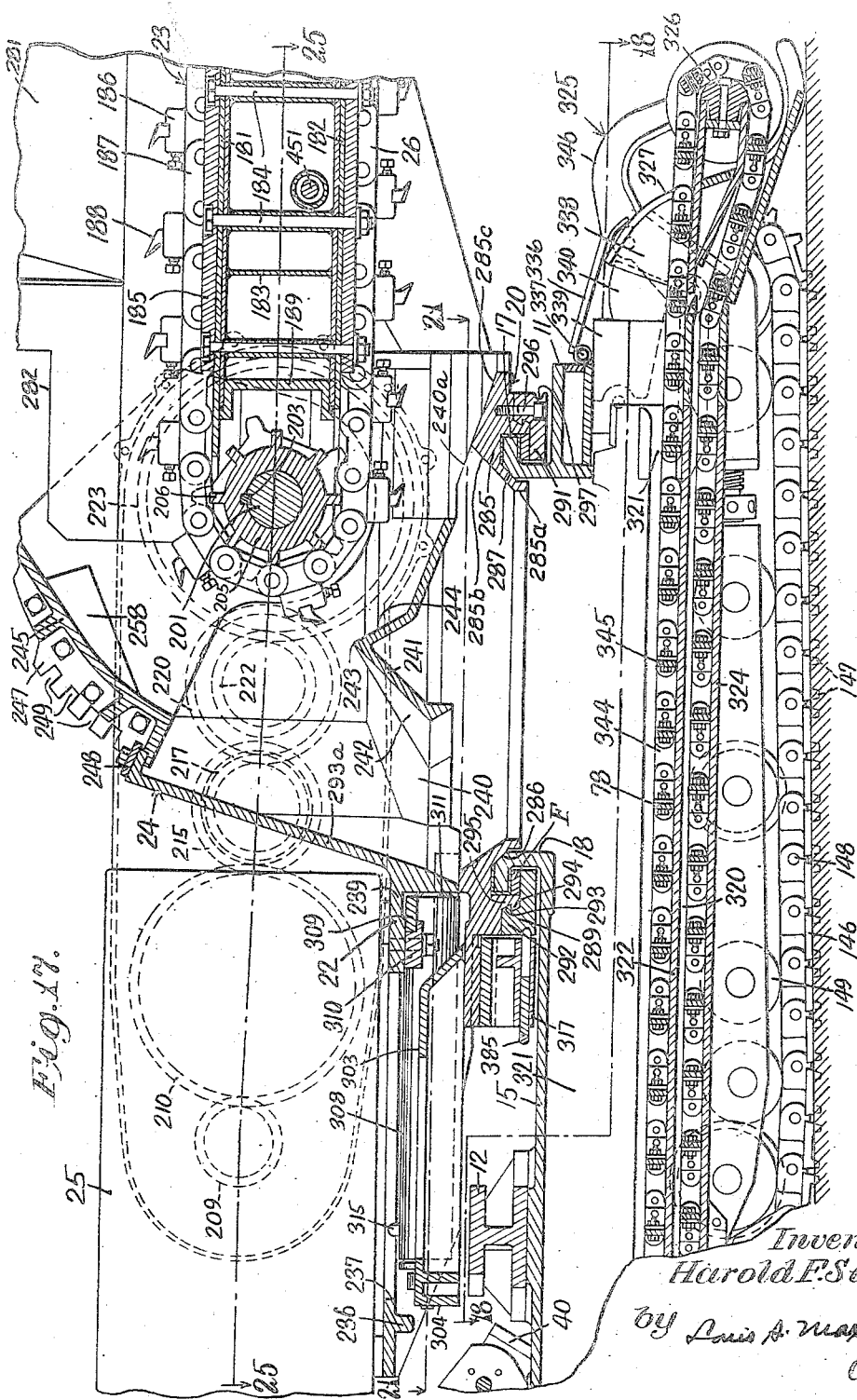

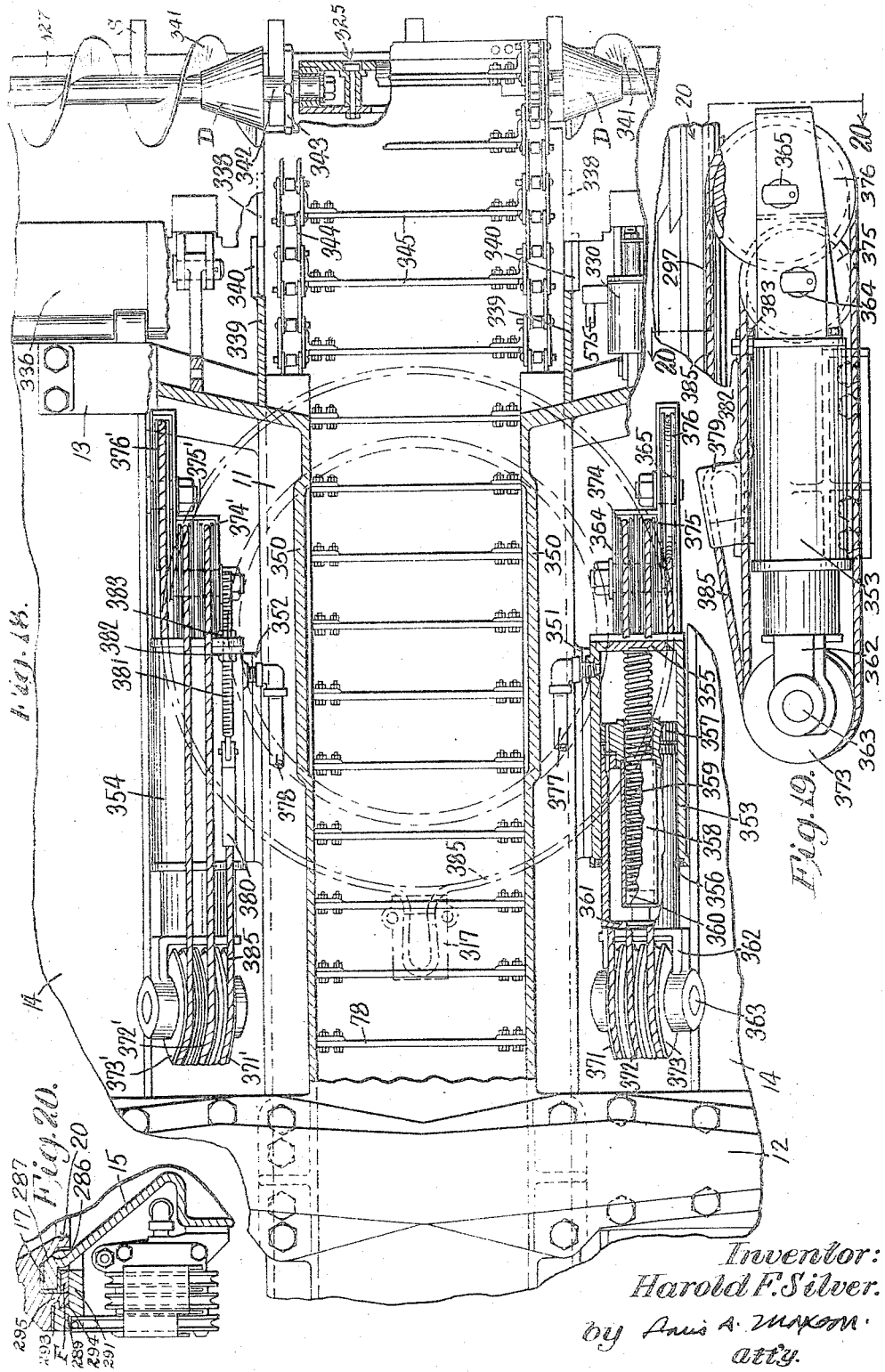

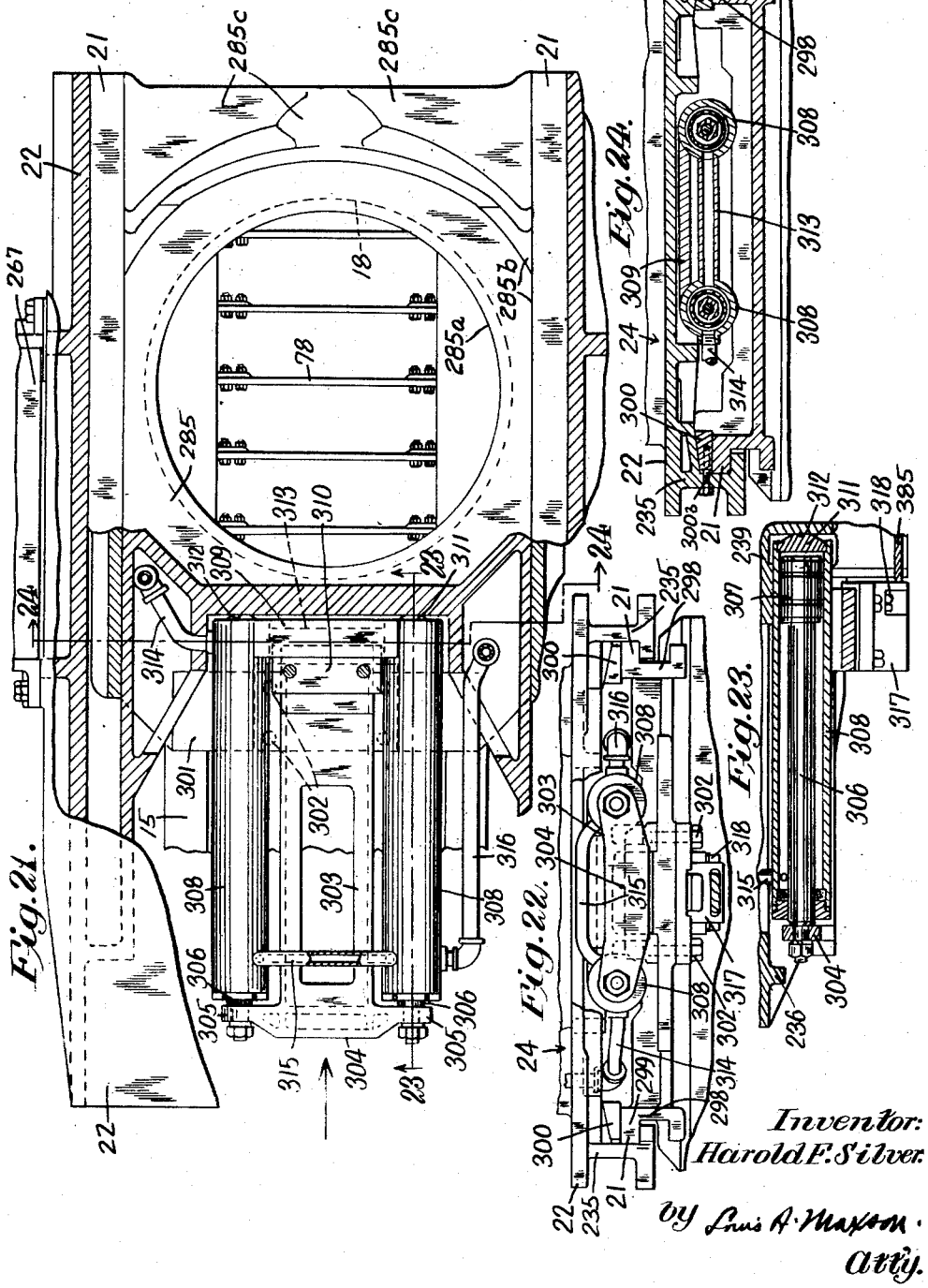

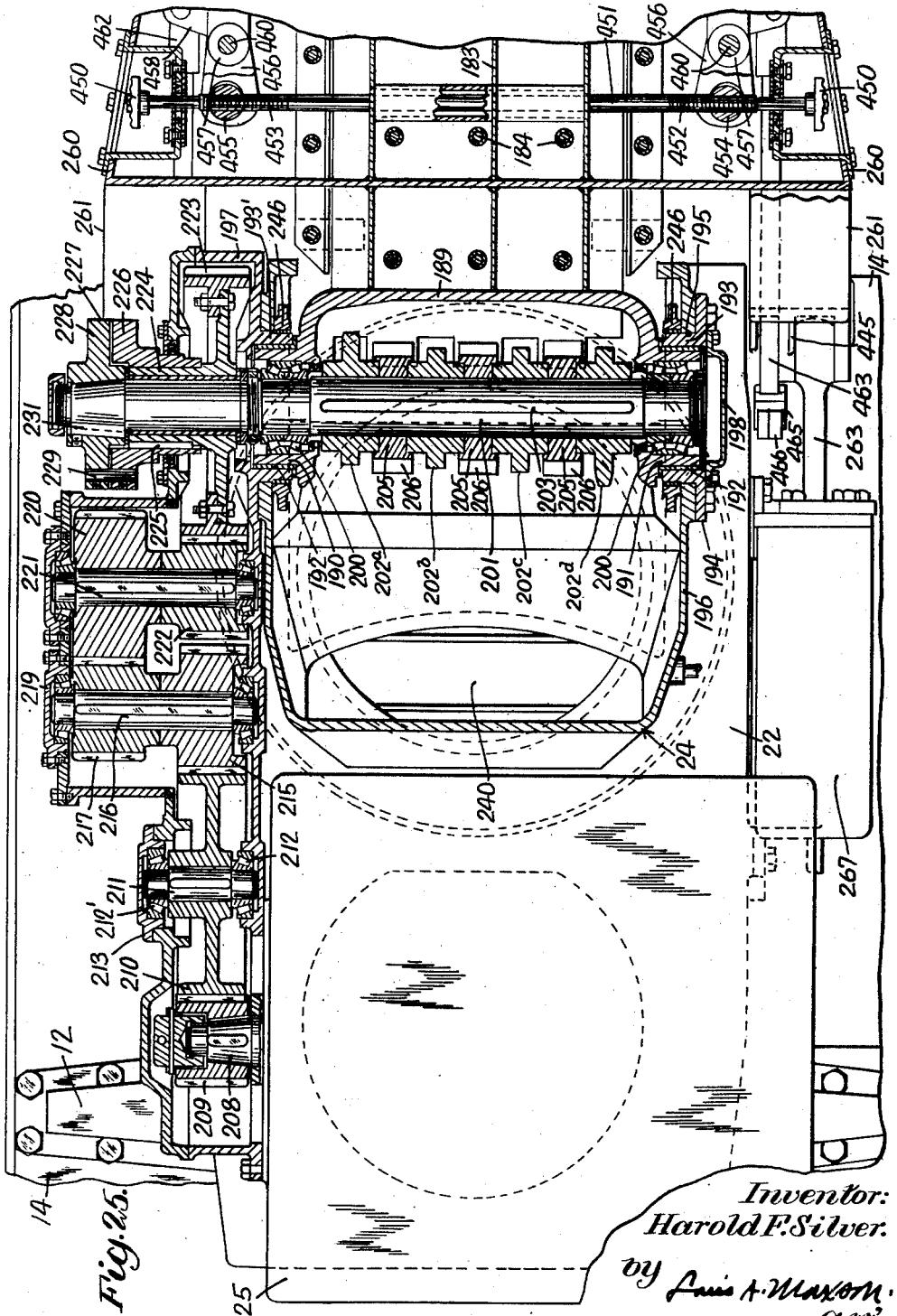

July 9, 1957 H. F. SILVER 2,798,711
APPARATUS FOR MINING COAL OR OTHER MINERALS FROM
THE SOLID WITH DEEPLY PENETRATING BITS
Filed Feb. 27, 1948 21 Sheets-Sheet 11
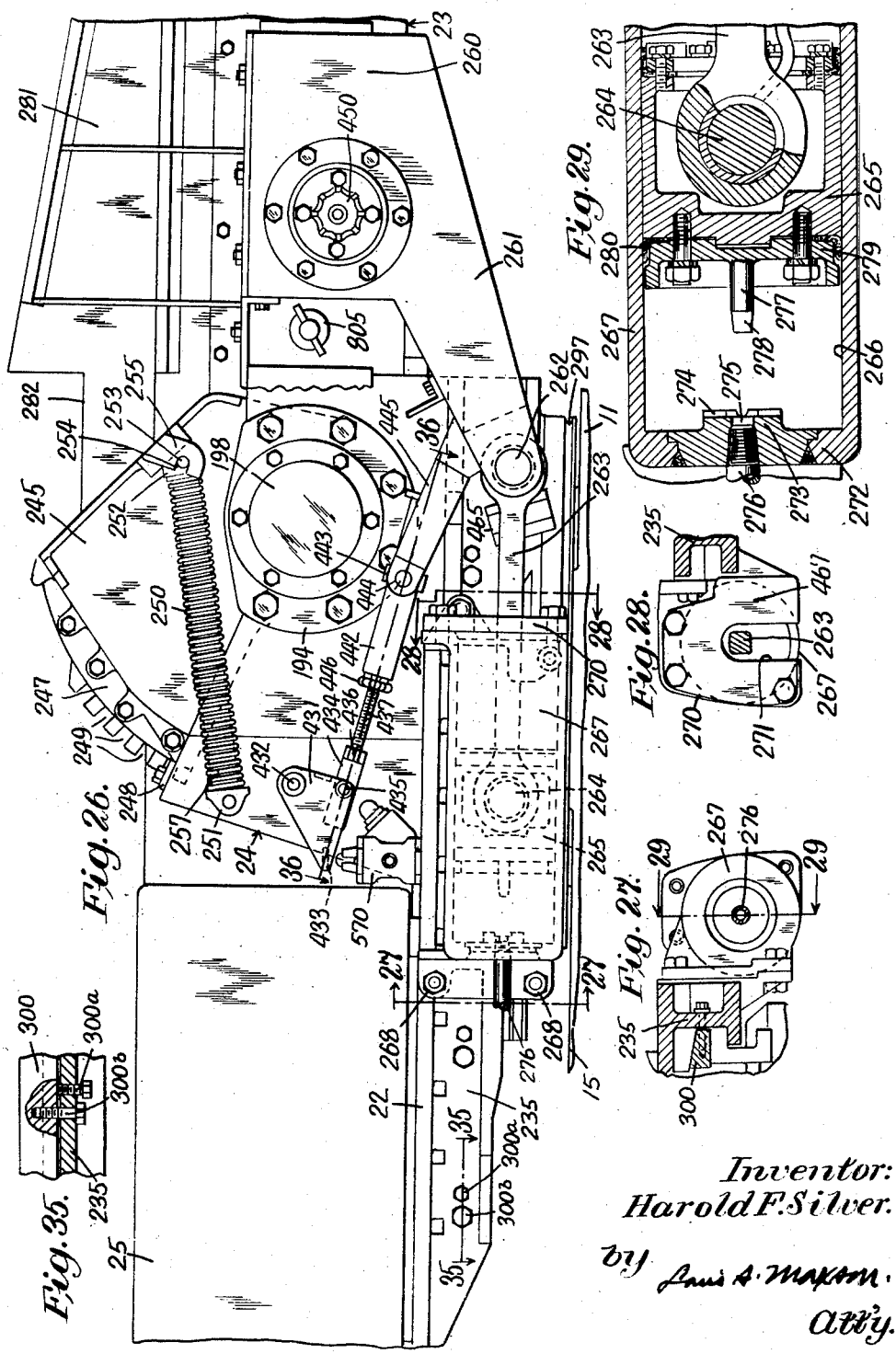
Inventor:
Harold F. Silver.
by Louis A. Maxam.
Atty.

July 9, 1957  H. F. SILVER  2,798,711
APPARATUS FOR MINING COAL OR OTHER MINERALS FROM
THE SOLID WITH DEEPLY PENETRATING BITS
Filed Feb. 27, 1948  21 Sheets-Sheet 12
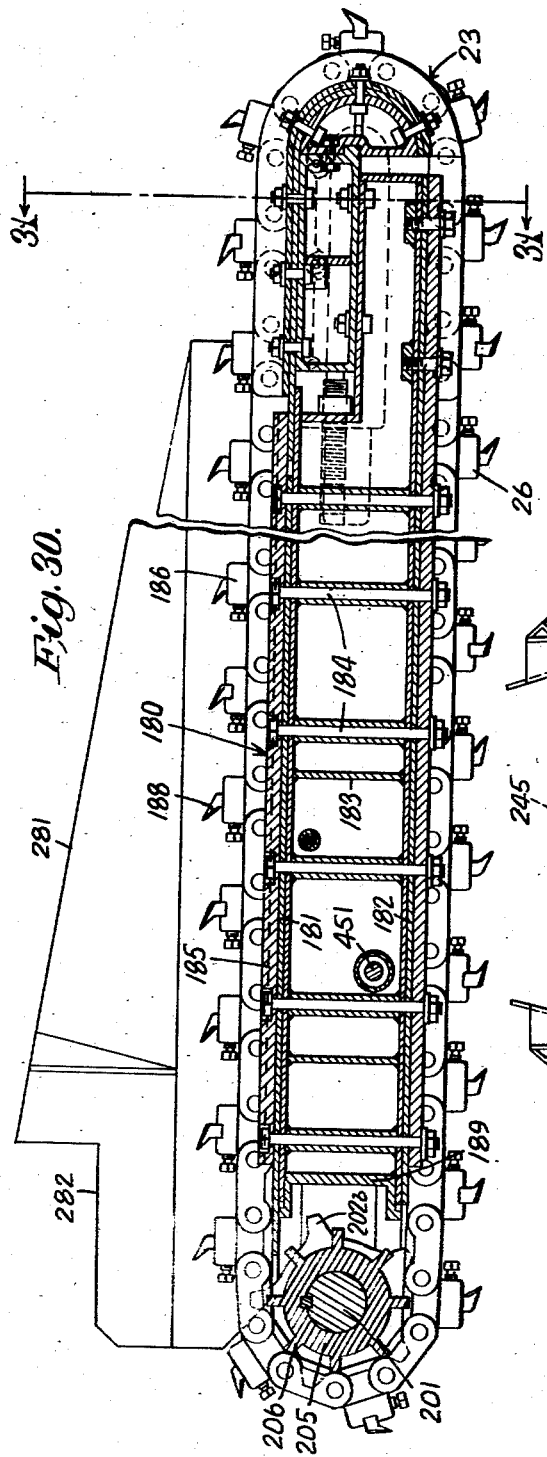
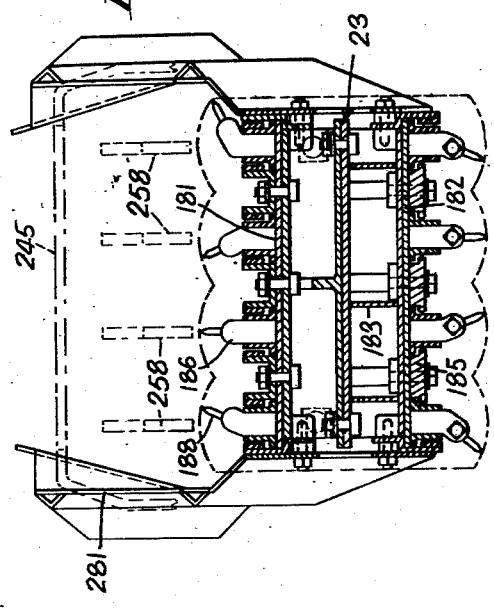
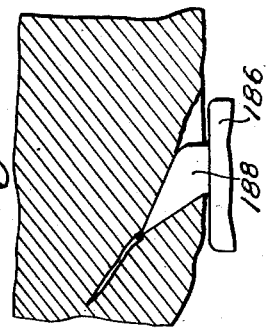
Inventor:
Harold F. Silver.

July 9, 1957
H. F. SILVER
2,798,711
APPARATUS FOR MINING COAL OR OTHER MINERALS FROM
THE SOLID WITH DEEPLY PENETRATING BITS
Filed Feb. 27, 1948
21 Sheets-Sheet 13
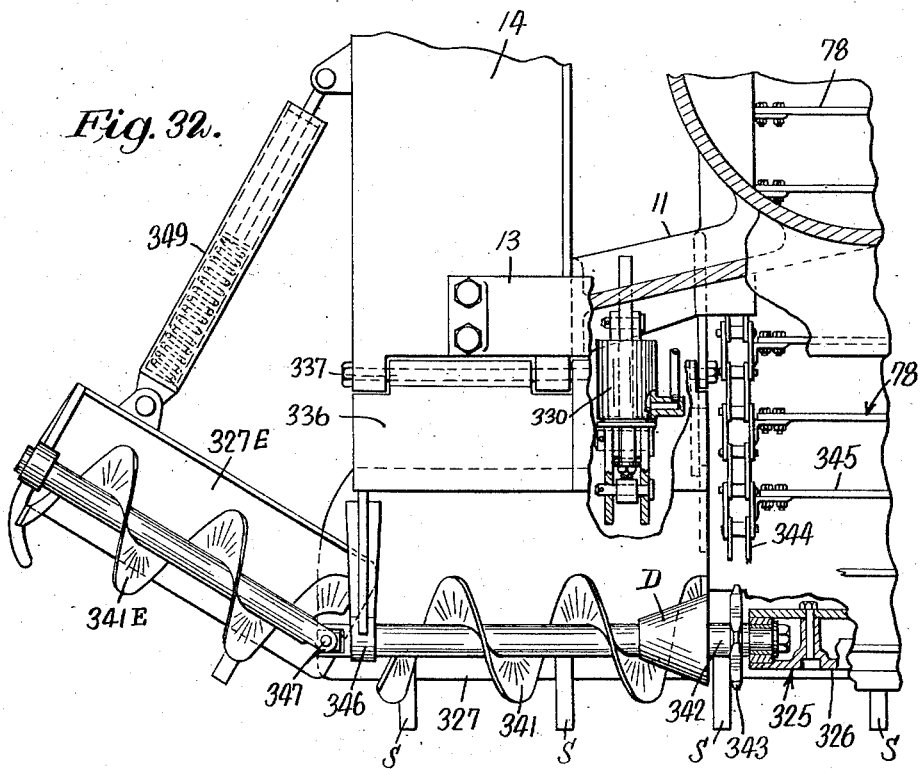
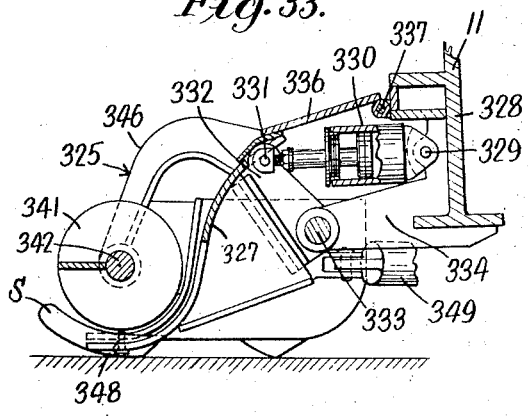
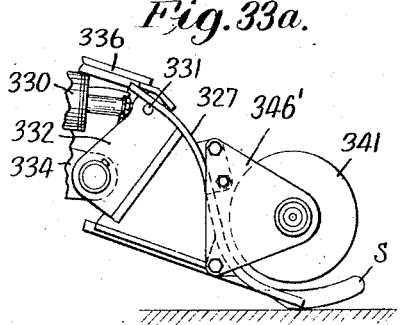
Inventor:
Harold F. Silver.
by Paul A. Maxon.
atty.

July 9, 1957

H. F. SILVER 2,798,711

APPARATUS FOR MINING COAL OR OTHER MINERALS FROM
THE SOLID WITH DEEPLY PENETRATING BITS

Filed Feb. 27, 1948

Inventor:
Harold F. Silver.
by Louis A. Maxon
Atty.

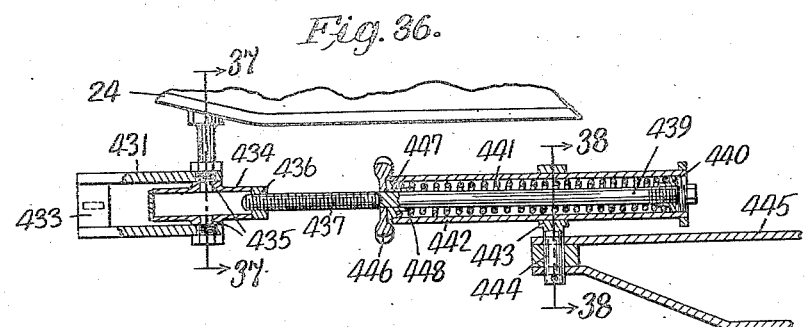
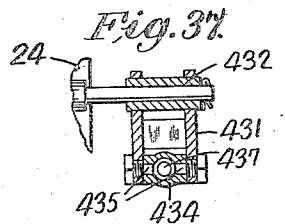
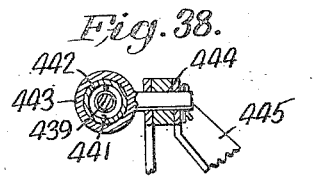
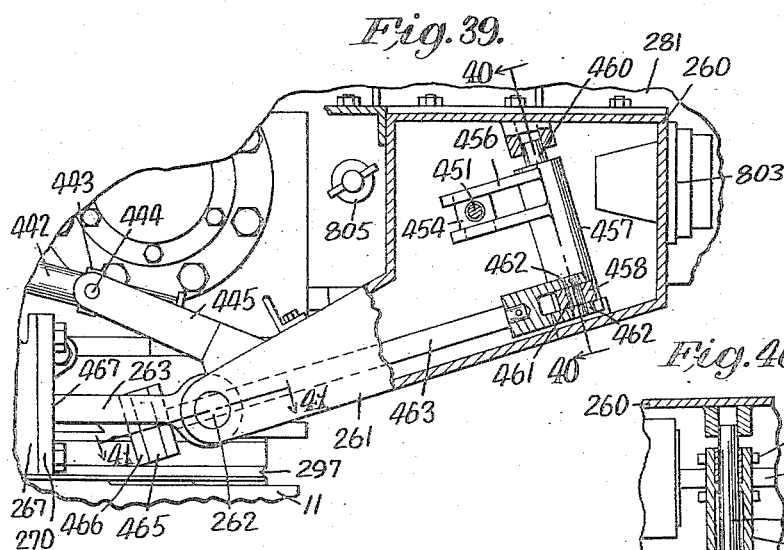
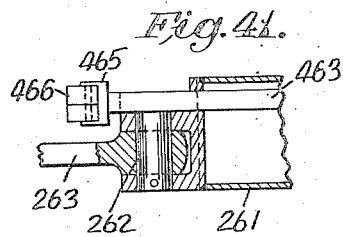
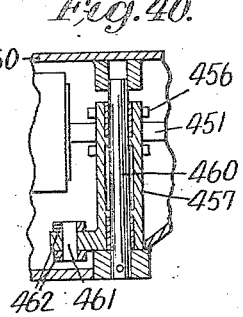

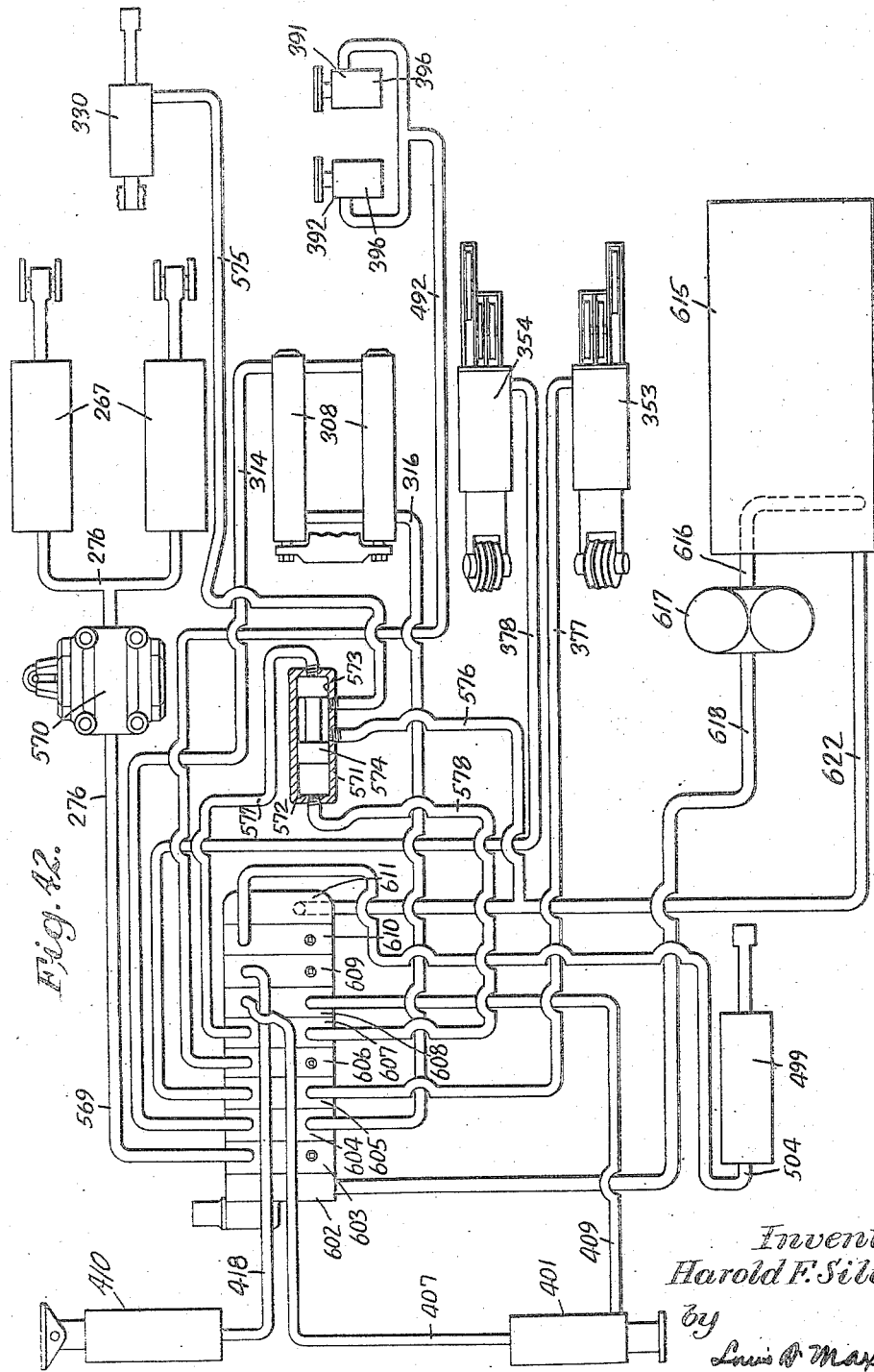

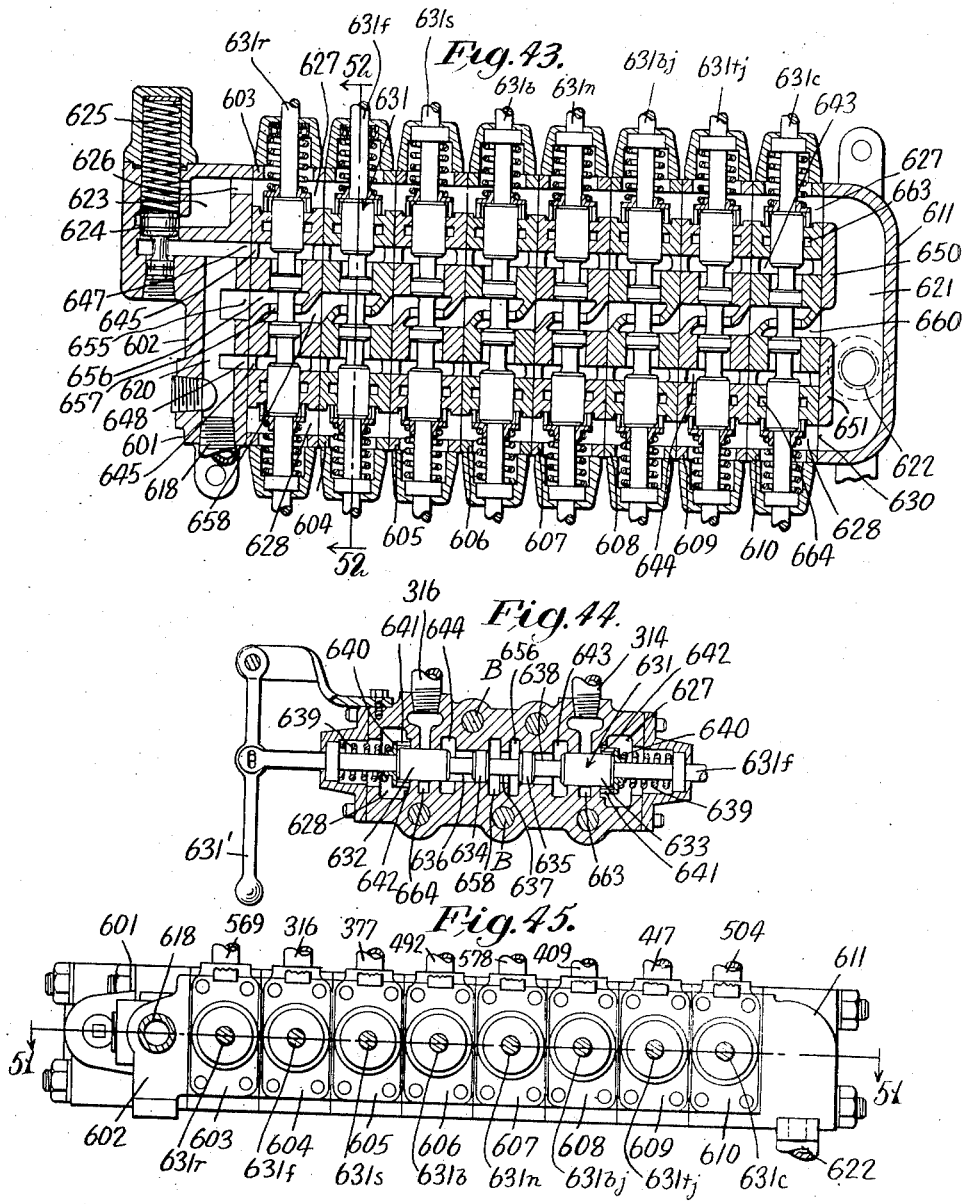

July 9, 1957

H. F. SILVER 2,798,711

APPARATUS FOR MINING COAL OR OTHER MINERALS FROM
THE SOLID WITH DEEPLY PENETRATING BITS

Filed Feb. 27, 1948

*Inventor:*
*Harold F. Silver.* by
*Paul A. Maxson.*
*Atty.*

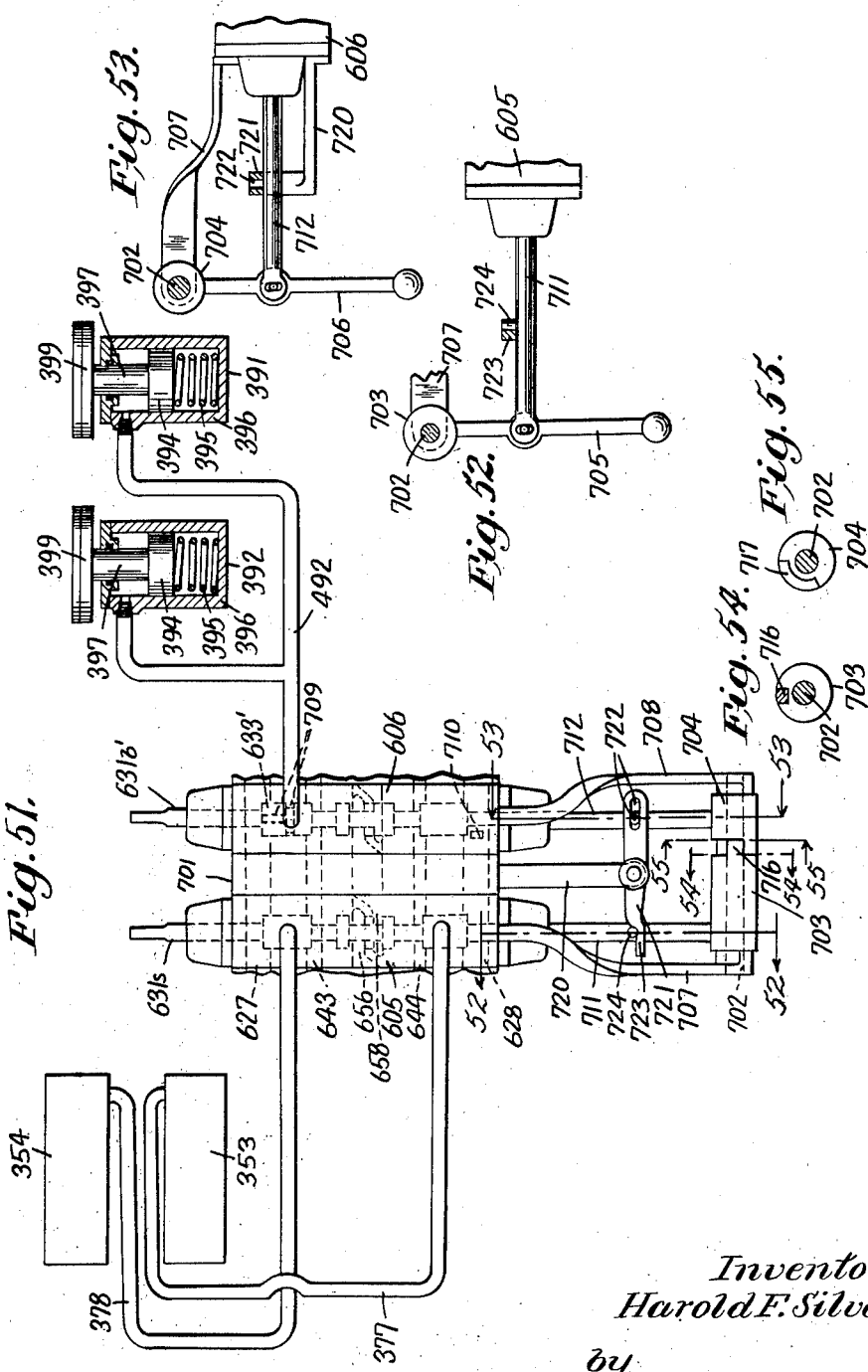

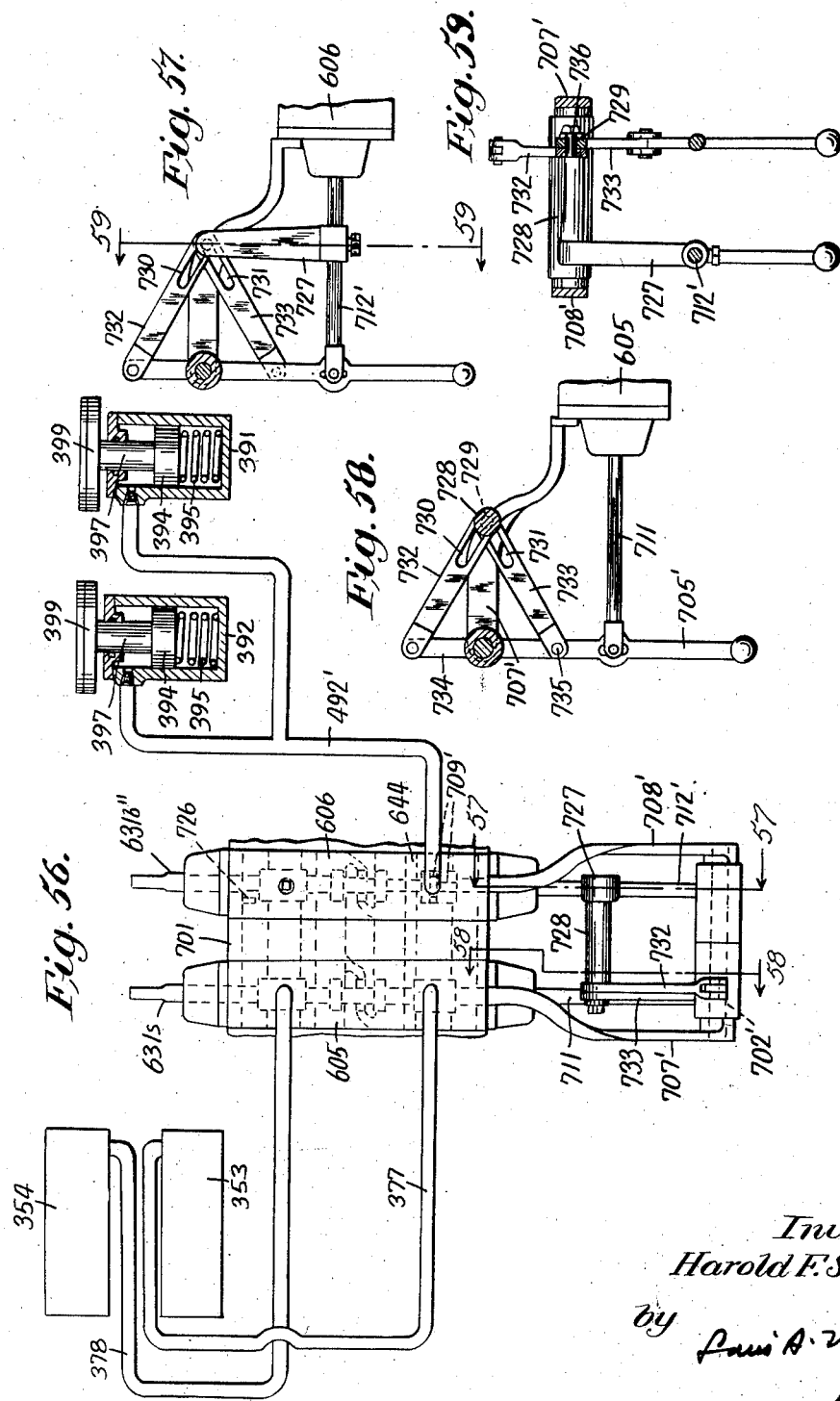

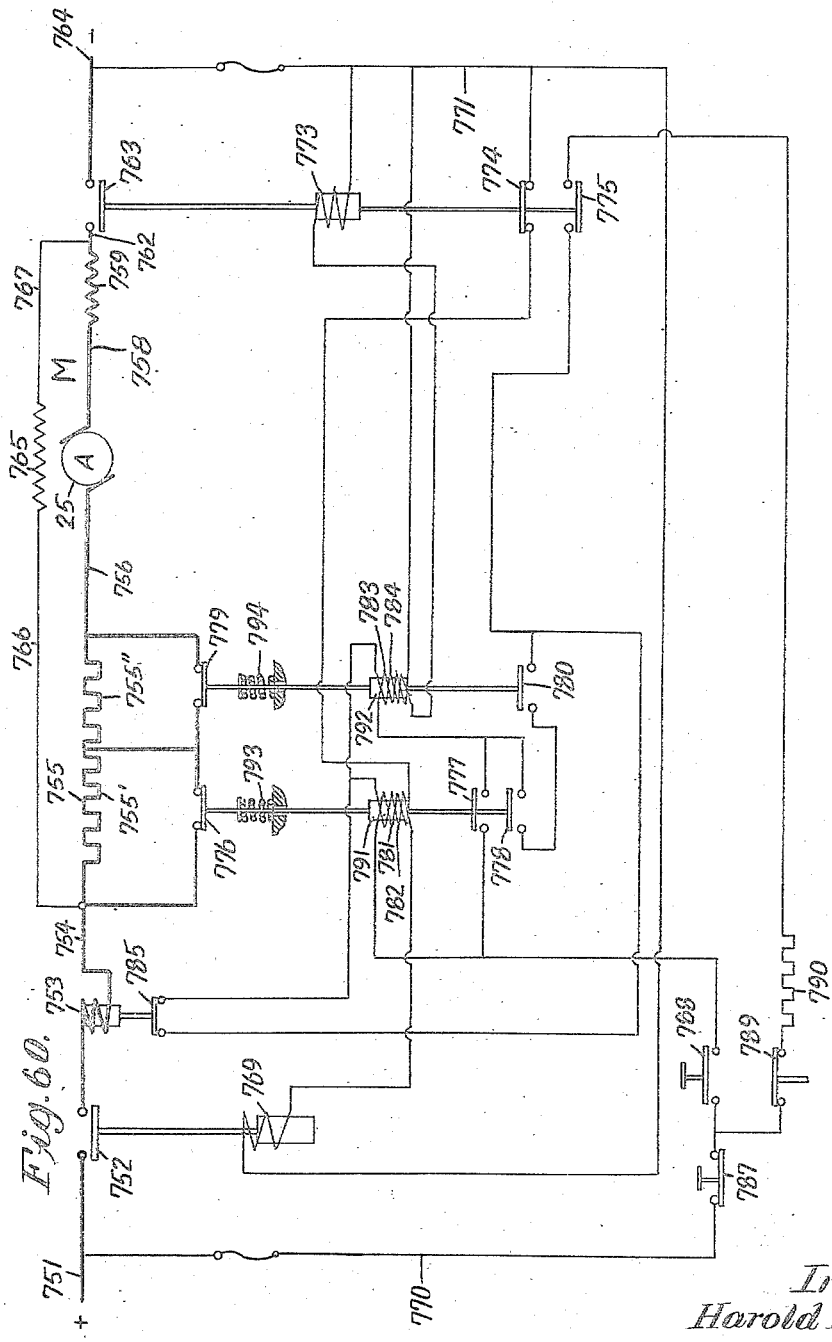

United States Patent Office 2,798,711
Patented July 9, 1957

2,798,711

APPARATUS FOR MINING COAL OR OTHER MINERALS FROM THE SOLID WITH DEEPLY PENETRATING BITS

Harold F. Silver, Denver, Colo., assignor to Joy Manufacturing Company, a corporation of Pennsylvania Application February 27, 1948, Serial No. 11,688

13 Claims. (Cl. 262—29)

My invention relates to apparatus for mining coal or other minerals from the solid, and for concurrently so handling and moving the coal or other mineral so mined that the same may be delivered to a mine transportation system without the necessity for manual loading. From other apparatus aspects it relates to improved apparatus for mining minerals from a vein by which the rate of detachment of the mineral may be speeded up and the proportion thereof of relatively large sized lumps increased, and by which there may be effected, notwithstanding the use of cutter bits, detachment of the mineral from the solid in large measure by a tearing, rather than a cutting operation.

This application is a continuation-in-part of my application Serial No. 750,981, filed May 28, 1947, for Apparatus and Method for Mining Coal or Other Minerals From the Solid, now abandoned.

Numerous attempts have been made to produce a successful machine for mining coal or other minerals from the solid and for so handling and delivering the coal or other mineral immediately after its detachment from the solid that a separate loading operation would be unnecessary. But so far as I am advised no truly successful machine capable of forming entries of practicable size, or at all capable of successful use in mine rooms, has ever been developed.

The problem which must be solved by a successful machine of this character involves the need for an apparatus for effecting detachment of the coal at a sufficiently rapid rate to make the machine practicable. In other words, it is necessary to have a coal-detaching—it may be a coal-severing—device capable of working on a wide enough portion of a face so that in a reasonable number of successive operations the necessary width may be covered, but at the same time not so wide that a prohibitive amount of power will be required. It is necessary that means be provided for effecting successive presentation of the face disintegrating apparatus to the face in a series of comparatively similar cycles; and it is highly desirable that the characteristics of the cycles be automatically controllable, at least to such an extent that an automatic continuation of the mine bottom at the desired elevation may be effected, and also an automatic maintenance of roof height, so that, on the one hand, excessive quantities of coal may not be left unmined, where a thin layer of coal left up may greatly reduce the necessity for timbering, and at the same time there may not be inadvertent penetration completely through the desired top layer of coal, with resultant access of air to the material above the coal seam, loss of roof strength, and necessity for timbering. It is another and very important requirement of any successful machine of this character that it shall be enabled to detach the coal or other mineral very rapidly but not be rendered inoperative in the event that a relatively large piece of material is torn from the face and moved rearwardly from it without immediate disintegration. It is further highly important that the material removed from the face shall practically all be handled as it is torn loose or otherwise separated from the face, in such a manner that escape thereof shall be avoided, for otherwise cleanup operations will be necessary to an undesirable extent.

It is desirable that the vein-attacking device shall not only be wide enough so that it may maintain the number of successive operations upon a given face within reason, but that it shall have, when its mode of initial attack upon the vein is to be a sumping operation, means for not only expeditiously effecting such an operation but also such a means as will not effect a penetration of the forward end of the vein-attacking device to such a depth as to require excessive power for a subsequent swinging operation but which will rather hold the depth of penetration within such limits that the bits, for example, with which the attacking device may be armed may so act, under the swinging forces exerted on the attacking device subsequent to sumping, that the mean rate of disintegration of the vein may exceed that which would result from each bit's operating purely as a cutting instrumentality.

The general objects of this invention are to improve the construction, and in consequence thereof the operation, of machines for mining coal and other solid materials that occur in veins, of the type in which the material is mined and concurrently carried to transportation equipment and to improve the construction and consequent operation of units that may advantageously be incorporated in such machines, all to the end that coal or other material may be mined rapidly and economically in desired form.

Specific objects of the invention will appear from the ensuing description of it.

In a preferred embodiment of my invention, the same may include a portable base, desirably supported for movement directly on the mine bottom, as for example by means of crawlers, and to be trammed over the mine bottom by the operation of said crawlers. Upon the main base there is desirably supported a frame which provides a passage through it for the movement of material, such frame desirably housing in different compartments thereof the opposite runs of a conveyor, desirably a flight conveyor, extending to a point at or at least near the rear end of the apparatus and adapted to discharge either directly, or through an intermediate delivery conveyor, to a material handling device such as a shaker conveyor, a shuttle car, a shuttle car loader, or any suitable form of transfer device constituting at least the initial portion of a system for moving the disintegrated coal or other material to some desired point.

The frame housing the main conveyor may desirably provide a vertical bearing which provides for angling, relative to the longitudinal lines of said apparatus, of a disintegrating apparatus which operates upon mineral bands of substantial width, first to penetrate the same at the approximate level of the mine bottom and then to remove the solid material, substantially for the depth of said sumping operation, to a desired upper level, primarily at least by a swinging movement relative to said vein. The disintegrating apparatus mentioned desirably has, between it and said vertical bearing providing means, means for supporting it for swinging movement on a horizontal axis and means for supporting it for rectilinear translatory movement along a guideway. More specifically, the frame housing the main conveyor may desirably support a turntable mounting having a vertical opening therethrough overlying a portion of the main conveyor and adapted to discharge onto it; and upon this mounting there may be desirably supported a rotatable turntable element, this element having associated with it means for effecting its rotation relative to the main frame, and having a somewhat funnel shaped opening in its upper portion so that it has a material receiving mouth, so to speak, substantially circular in outline at its top, communicating with the opening in the turntable support. The turntable element is adapted to support for movement diametrically thereof a frame supporting a disintegrating apparatus and to this end the turntable element may desirably be provided with parallel guides at its opposite sides and may thereby support a frame portion to which there may be secured the stationary elements of cylinder and piston mechanisms, desirably a pair of these, the forward ends of the movable element or elements of which shall be in end abutment with surfaces on a longitudinally reciprocable frame supported and guided by said guideways. As noted, a longitudinally reciprocable frame may be mounted upon the rotatable turntable and guided as by the guideways of the latter, and may support a disintegrating apparatus, an arrangement for receiving material brought back from the vein by the disintegrating apparatus, and discharging the same into the turntable, and a driving motor for the disintegrating apparatus. Desirably the disintegrated material receiving and funneling arrangement may include a hood with an adjustable top, arranged to the rear of the major portion of the disintegrating apparatus and including a discharge opening to which the disintegrated material is delivered by the disintegrating apparatus, said discharge opening so shaped and of such dimension that its opening communicates in all positions of said sliding frame relative to said turntable with the top opening in the latter. Desirably, even when the turntable is rotatable to cause said sliding frame as it reciprocates to move in paths making a rather wide angle with the central longitudinal line of the main frame of the apparatus, the shape and relative size of the opening in said hood and the range of longitudinal movement of said sliding frame will be such that the coal or other material brought to said hood by said disintegrating apparatus will be discharged through the opening in the bottom of the hood and in the mounting therefor on the main frame, onto the main conveyor. The hood may desirably have an adjustable upper portion, desirably suitably counterbalanced and having means for locking it in different adjusted positions, and further having breaker lugs therein adapted to obstruct the entry into the hood of masses of coal or other material so large as to cause danger of blocking the discharge opening of the hood or choking the passage through which the main conveyor travels.

The disintegrating apparatus may be in the form of a relatively wide frame having circulated about its periphery in vertical planes material-disintegrating elements arranged in such a pattern as completely to disintegrate all of the material in a relatively wide mineral band or section of a seam, a very satisfactory arrangement including a number of chains, for example four, equipped with cutter bits for ripping or tearing out completely all of the coal over a width of perhaps a couple of feet when brought into contact with a vein. Desirably the disintegrating apparatus may be arranged, as by the adjustment of the relative positions of chain driving sprockets, to provide for attacking the vein by a succession of severing impacts delivered by arrangements of the bits in transverse rows whose width transverse to the median line of such rows is much less than the distance, in the direction of circulation of the bits, between the median lines of successive bit rows. Desirably means are provided which are so constructed and arranged as to effect circulation of the disintegrating elements in their orbits and swinging movement of said disintegrating apparatus automatically at related rates such that the disintegrating bar is swung materially faster at substantially all times throughout its range of swing than would be possible if the disintegrating elements were simply removing the mineral by a cutting action. Desirably, means may be included in the apparatus for automatically shutting off at suitable times the delivery of hydraulic fluid for effecting elevation of the forward portion of the disintegrating apparatus to maintain a uniform roof height, and desirably cushioning and abutment devices may be included for stopping the downward motion of the forward end of the disintegrating apparatus normally to maintain a uniform bottom.

The foregoing broad summary of features which may be included in various embodiments of my invention is not to be construed as limiting my invention, and the scope of the latter is to be ascertained from the claims appended to this specification.

In the accompanying drawings, in which one form of my invention, and certain modifications thereof, are shown for purposes of illustration, Fig. 1 is a side elevational view showing an illustrative embodiment of my invention.

Fig. 2 is a plan view of the apparatus shown in Fig. 1.

Fig. 3 is an enlarged side elevational view of the rear end of the primary apparatus, with parts broken away to show details, and other parts omitted.

Fig. 4 is an enlarged side elevational, fragmentary view, with parts broken away, to show a portion of the drive for the crawlers or tractor treads.

Fig. 5 is a detail sectional view taken on the plane of the line 5—5 of Fig. 8.

Fig. 6 is a transverse, generally vertical section on the planes of the line 6—6 of Fig. 4, showing the multispeed driving and braking arrangement for the crawlers or tractor treads, etc.

Fig. 7 is a fragmentary elevational view showing the control for the selective fast and slow speed drive for the crawlers or tractor treads.

Fig. 8 is a generally horizontal section on the planes of the line 8—8 of Fig. 4.

Fig. 9 is a vertical, longitudinal section on the plane of the line 9—9 of Fig. 8.

Fig. 10 is a horizontal section on the plane of the line 10—10 of Fig. 9.

Fig. 11 is a fragmentary vertical section on the plane of the line 11—11 of Fig. 10.

Fig. 12 is a fragmentary vertical sectional view on the plane of the section line 12—12 of Fig. 10.

Fig. 13 is a generally horizontal sectional view on the plane of the section line 13—13 of Fig. 4, showing details of the drive for a crawler or tractor tread.

Fig. 14 is a fragmentary horizontal view, with parts removed, showing the turntable mechanism, and having parts broken away to show details of the turntable braking devices.

Fig. 15 is an enlarged detail vertical section, with parts in full, on the plane of the line 15—15 of Fig. 14 and showing some parts not present in that figure.

Fig. 16 is an enlarged vertical sectional view on the planes of line 16—16 of Fig. 14.

Fig. 17 is an enlarged vertical sectional view taken on the plane of the section line 17—17 of Fig. 2 and with parts omitted, this view showing principal parts of the primary apparatus forward of the structure illustrated in Fig. 3.

Fig. 18 is a fragmentary horizontal sectional view taken on the planes of the line 18—18 of Fig. 17, with some parts shown in elevation, and particularly disclosing turntable swing, and material pickup mechanism.

Fig. 19 is a fragmentary side elevational view showing a detail of the turntable swinging mechanism.

Fig. 20 is a detail vertical sectional view, with parts in full, on the planes of the section line 20—20 of Fig. 19.

Fig. 21 is a fragmentary horizontal sectional view on the planes of the line 21—21 of Fig. 17, showing, among other things, details of sumping and withdrawing apparatus.

Fig. 22 is a fragmentary rear end view of the sumping and withdrawing apparatus, looking in the direction of the arrow in Fig. 21.

Fig. 23 is a longitudinal, vertical detail sectional view on the plane of the section line 23—23 of Fig. 21.

Fig. 24 is a detail cross sectional view on the planes of the section line 24—24 of Fig. 21.

Fig. 25 is a fragmentary horizontal sectional view on the plane of the section line 25—25 of Fig. 17, showing some details of the disintegrating mechanism, etc.

Fig. 26 is a fragmentary side elevational view of portions of the disintegrating mechanism.

Fig. 27 is a detail vertical sectional view, with parts in full, on the plane of the line 27—27 of Fig. 26.

Fig. 28 is a a detail vertical sectional view, with parts in full, on the plane of the section line 28—28 of Fig. 26.

Fig. 29 is an enlarged vertical sectional view on the plane of the section line 29—29 of Fig. 27.

Fig. 30 is a longitudinal view in vertical section through the chain gang or disintegrating mechanism.

Fig. 31 is a transverse vertical section through the disintegrating mechanism of Fig. 30, taken on the plane of the line 31—31 of Fig. 30.

Fig. 32 is a fragmentary plan view showing details of the side scroll construction.

Fig. 33 is a detail vertical sectional view, with parts in full, showing the cylinder and piston mechanism for adjusting the front end of the delivery conveyor and the scrolls associated with it.

Fig. 33a is a detail sectional view on the same general plane as Fig. 33, showing a construction which may be used when front scrolls only are employed.

Fig. 35 is a detail horizontal section showing the adjustment for the guideways, this view taken on the plane of the section line 35—35 of Fig. 26.

Fig. 36 is a detail sectional view on the plane of the line 36—36 of Fig. 26, with parts omitted and showing details of an automatic control mechanism for limiting the upward movement of the disintegrating means.

Fig. 37 is a detail sectional view on the plane of the line 37—37 of Fig. 36.

Fig. 38 is a detail sectional view on the plane of the line 38—38 of Fig. 36.

Fig. 39 is an enlarged vertical sectional view on the plane of the line 39—39 of Fig. 2, with parts omitted and showing details of the automatic control of lowering of the disintegrating means.

Fig. 40 is a detail, fragmentary, sectional view on the plane of the line 40—40 of Fig. 39.

Fig. 41 is a detail, fragmentary, sectional view on the plane of the line 41—41 of Fig. 39.

Fig. 42 is a diagrammatic view showing a hydraulic control system.

Fig. 43 is a horizontal section on the plane of the line 43—43 of Fig. 45, through a hydraulic control valve box group.

Fig. 44 is a vertical section on the plane of the line 44—44 of Fig. 43.

Fig. 45 is an end elevational view of the group of valve boxes shown in Fig. 43, with manual controls for the valves omitted.

Fig. 51 is a partially diagrammatic or schematic view showing a modified form of control mechanism.

Fig. 52 is a detail vertical section on the plane of the line 52—52 of Fig. 51.

Fig. 53 is a similar detail vertical section on the plane of the line 53—53 of Fig. 51.

Fig. 54 is a detail vertical section on the plane of the line 54—54 of Fig. 51.

Fig. 55 is a detail vertical section on the plane of the line 55—55 of Fig. 51.

Fig. 56 is another partially diagrammatic or schematic view showing a different modification of control mechanism.

Fig. 57 is a vertical section on the plane of the line 57—57 of Fig. 56.

Fig. 58 is a vertical section on the plane of the line 58—58 of Fig. 56.

Fig. 59 is a vertical section on the plane of the section line 59—59 of Fig. 57.

Fig. 60 is a view showing an electric circuit for the motor which drives the disintegrating mechanism.

Fig. 61 is a schematic view showing a disintegrating element penetrating deeply into the mineral according to the present invention and showing a fracture line of a lump of mineral to be removed.

Figure 49:
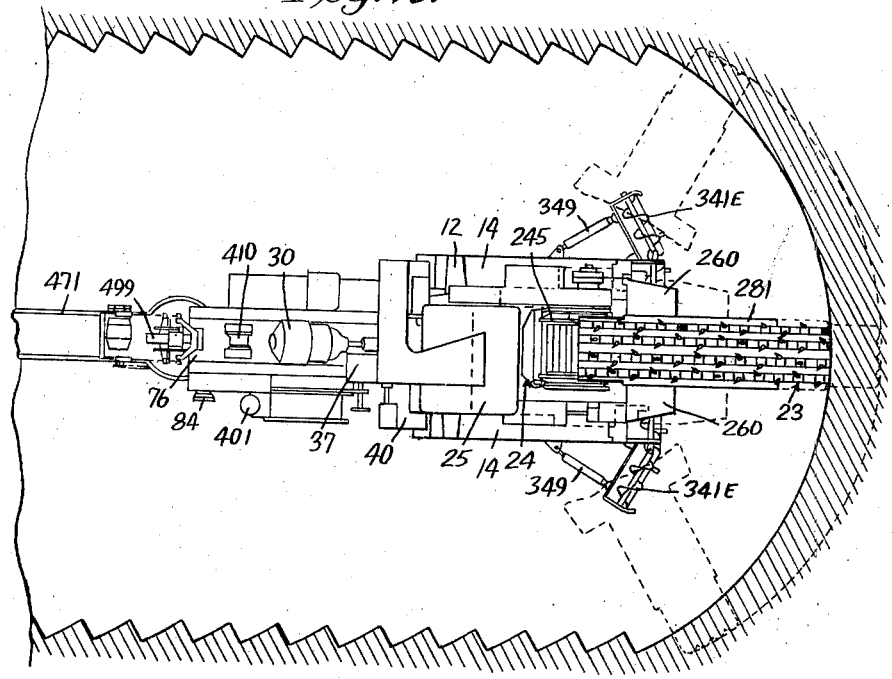
Fig. 49 is a diagrammatic view illustrating the practice of the invention, being in the nature of a plan view.
Figure 50:
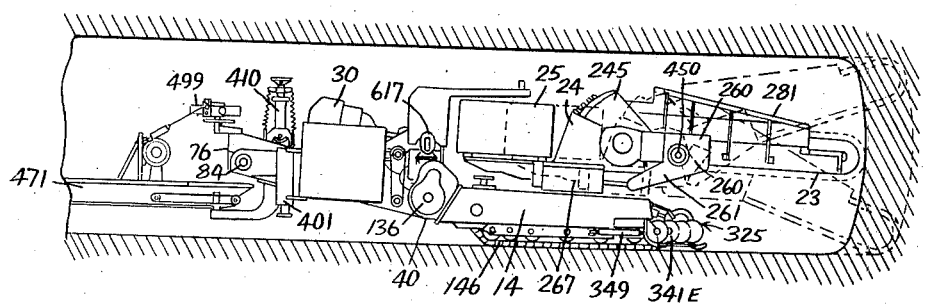
Fig. 50 is a diagrammatic view in the nature of a side elevation or a vertical section, showing the employment of the invention.

An illustrative embodiment of my improved apparatus for disintegrating a mineral vein, collecting the material as it is detached from the solid vein, and delivering to an initial discharge point, is shown in Figs. 1 to 41, both inclusive; and a suitable control arrangement for the hydraulically operated devices is shown in Figs. 42 to 48; Figs. 49 and 50 are operating views; and Figs. 51 to 59 show possible modifications. Fig. 60 is a wiring diagram.

The illustrative embodiment shown in Figs. 1 to 41 includes a tractor or crawler type truck consisting of a body 11 which is supported, by a rear transverse support member 12 and by generally oppositely extending forward foot members 13, on tractor or crawler frames 14. The body 11 comprises (as shown) a passage-forming section 15 through which coal taken from the face is discharged to a delivery conveyor section 16; and the body 11 includes a turntable bearing 17 at its forward end, this bearing projecting above the top of the passage-forming section 15 and having an open bottom, as at 18. Upon the turntable bearing portion there is mounted, for rotation on a vertical axis, a turntable element generally designated 20 which carries guides 21 at its opposite sides and which supports an elongated reciprocable frame portion 22 which is supported by the turntable for reciprocation relative to the latter in horizontal planes and which carries a disintegrating mechanism generally designated 23, a cuttings-receiving and discharge hood or chute section 24, and a driving motor 25 for actuating the several chains 26 which make up the illustrated disintegrating mechanism 23. The apparatus as a whole also includes various operating mechanisms which will be later described, and, in addition to the motor 25 for actuating the disintegrating mechanism, includes another motor 30 for driving the primary conveyor, a lubricant pump, an oil pump supplying fluid to operate various devices, and the crawler or tractor treads.

The supporting and propulsion mechanism for the machine will first be described. The motor 30 has a power shaft 31, connected by a coupling 32 to a shaft 33 which carries, fixed thereto, a bevel drive pinion 34. This bevel drive pinion is suitably journalled in a portion of a gear casing 36 which is mounted on a larger multi-piece gear casing 37. The pinion 34 meshes with and drives a bevel gear 38 keyed to a transverse shaft 39 journalled in the gear casing 37 and in another gear casing element 40. The shaft 39, which drives as later described, the oil pump, has keyed to it a sleeve 41 on which there is integrally formed a spur drive pinion 42 and on which there is also carried a larger spur drive gear 43, non-rotatively secured in any suitable manner to the sleeve 41. The drive pinion 42 and the drive gear 43 constitute the drive elements of a low and high speed mechanism 44, and the drive pinion 42 meshes with a gear 45 journalled on a bearing sleve 46 on a shaft 47 which is journalled, as at 49 and 50, in the gear casing elements 37 and 40. The gear 45 is freely rotatable relative to the shaft 47, but has clutch jaws 51 by means of which, as later described, it may be connected in driving relation with the shaft 47. The larger drive pinion 43 engages a gear member 53, which has clutch jaws 54 formed on it; and these clutch jaws may be engaged with the clutch jaws 51 by sliding the member 53 to the right in Fig. 6. When the gear 53 occupies the position shown in Fig. 6, however, it transmits the rotation which it derives from the driving gear 43 to the shaft 47 through a spline connection 55. It will be noted, therefore, that the shaft 47 will be rotated at a relatively high speed when the gear 53 is in the position shown in Fig. 6 and at a slower speed through the gear 45, the clutch jaws 51 and 54, and the spline connection 55, when the clutch jaws are engaged with each other and the gear 53 is disengaged from the driving gear 43. Any suitable means may be provided for shifting the gear 53 from one position to the other, and I have provided a shifter fork 57 engaging trunnions 58 on a shipper member 59 fitted over an annular flange 60 formed on the gear 53; and the fork is secured, as at 62, to a vertical shaft 63 having an operating handle 64 and journalled in a bore 65 in the gear casing portion 37.

The gear 45 has keyed to its hub portion 66 a gear 67 which obviously rotates whenever the gear 45 is turned; and this gear 67, as may be seen in Figs. 6 and 8, meshes with and drives a gear 68 carried on a shaft 69 journaled at 70 in the gear casing 37 and at 71 in the gear casing portion 40. The shaft 69 carries a sprocket 72, which drives a chain 73, which engages a sprocket 74 suitably mounted, as later described, on a shaft 75 carried near the rear end of a rearward frame portion 76. Sprocket 74 normally drives shaft 75 when it is itself rotating. On the shaft 75 there are mounted drive sprockets 77, 77 which drive a flight conveyor 78, later more fully described. Another sprocket 79, mounted on the shaft 69, drives a chain 80 which serves, through a further sprocket connection 81, to drive a lubricant pump 82 for providing, through conduits not shown, lubricant under pressure to parts requiring such lubrication. The shaft 75 is provided with a splined portion 83 on which a clutch jaw carrying element 84 is slidably arranged, being normally held with its bevel edged jaw elements 85 in interlocking engagement with similarly beveled jaw elements 86 carried on the sprocket 74. A resilient, deformable, snap type, spring disc 87 held in position by a screw and nut connection 88 at the end of the shaft 75, normally holds the jaws 85 and 86 in cooperating relation, but in the event that the conveyor 78 becomes stuck, as by jamming by an unduly large piece of coal, the jaws 86 will so coact with the jaws 85 as to force the member 84 to the right in Fig. 34, against the pressure of the spring disc 87 and interrupt the drive. The action of the spring disc 87 is such that when it has been forced past a certain predetermined position it snaps in the other direction and allows the element 84, which is connected to drive the shaft 75, to remain out of contact with the clutch jaws 86. When the member 84 is moved to this last mentioned position, it may actuate a switch 89 to break a circuit C, diagrammatically illustrated in Fig. 34, and stop the motor which drives the bit actuating chains, thus preventing the bringing back of additional material which would not be carried away by the conveyor 78. When the conveyor 78 has been freed from its obstruction, the member 84 and the disc 87 may be moved to cause the jaws 85 of the member 84 to reengage with the jaws 86, and drive of the shaft 75 and of the flight conveyor carried thereby may be reinitiated, the movement of the member 84 to the left freeing the spring pressed switch element in the circuit C for a return to closed circuit position. It will be appreciated that actually the switch arrangement 89 would control a pilot circuit, and this switch would not break a circuit carrying the full current required by a 100 H. P. motor. While it is unnecessary to illustrate the type of circuit which would be actually used in practice (because motor starting circuits may assume many forms), a suitable circuit is shown in Fig. 60.

That the spline shaft 47 may be driven at two speeds, each in the same direction, has been noted. This shaft 47 is adapted to drive in opposite directions, through drive connections which will now be explained, the tractor or crawler treads which support the apparatus.

The spline shaft 47 has slidably secured to it a driving gear 90, which may be moved by means of a groove 91 in its hub portion 92, longitudinally of the shaft 47. A shipper yoke 93 carried by a transversely extending rod 94 has portions 93S engaging in the groove 91; and the rod 94 can be shifted longitudinally by means of a pivoted lever 95 mounted on the cover 96 of the gear casing portion 36, and having at one end thereof an operating handle 97. The gear 90, in the position shown in Fig. 6, meshes with a gear 101 mounted in bearings 102 supported by the casing element 40. The gear 101 also meshes with a gear 105 formed on a sleeve 106, which also carries a larger gear 107 of appropriate construction and size to be engaged by the gear 90 when the latter is moved to the left in Fig. 6 from the position shown, and is disengaged from the gear 101. It will thus be seen that the gear 101 is adapted to be driven directly by the gear 90 in a direction opposite to the direction of rotation of the gear 90, and by the gear 90 through the gear 107, sleeve 106 and pinion 105, which meshes with the gear 101, in the same direction with the gear 90. The sleeve 106 is suitably journaled on a shaft 110 mounted at its opposite ends in the casing portion 40 and supporting a bearing element 111 between it and the wall of the bore 112 which extends through the sleeve 106 and the gears 105 and 107.

The gear 101 has bolted to it a sleeve 114 to which there are appropriately fixed a series of inwardly projecting friction discs 115, while with these discs there are interleaved other discs 116 connected by splines 117 and notches, not shown in view of the small scale employed, with a sleeve 118 splined as at 119 to a shaft 120 journaled as at 121 in the hub of the gear 101 and at 122 in a member 123 which forms the casing of a braking mechanism generally designated 124. Radially projecting portions formed thereon connect a series of friction discs 127, as shown in Fig. 10, to the brake casing 123, while an intermediate series of discs 128 is connected by splines 129 to a sleeve 130 keyed by the key 119 to the shaft 120. The shaft 120 carries, at its left hand end in Fig. 6, a drive pinion 132 which meshes with a gear 133 formed on a sleeve 134, journaled on a shaft 135 supported in the wall of the housing 40 and in a cover plate 136 associated with the housing. The sleeve 134 carries a drive pinion 137 which actuates, through a speed reduction gearing including a large gear 138 and a coaxial small pinion 139 fixed to the gear 138, and a large gear 140 keyed as at 141 to a transverse shaft 142, a tractor or crawler tread drive sprocket 143 having a sleeve portion 144 which is splined at 145 to the shaft 142 for rotation with the latter. The tractor or crawler tread drive sprocket 143 drives a flexible tractor or crawler tread 146 made up of a plurality of ground-engaging elements 147 pivotally connected at 148 and supported by rollers 149 journaled on non-rotating shafts 150 which are secured in the walls of tractor or crawler frames 14.

So far, the drive and braking provisions for the crawler or tractor tread at the right hand side of the machine (looking forward) have been described, but it will be understood, of course, that at the left hand side of the machine there is an essentially duplicate crawler or tractor tread with corresponding braking and driving means, the parts of which are indicated, to the extent to which they are visible and have seemed to warrant marking, by primed numbers corresponding to the numbers used in the detailed explanation of the mechanism at the right hand side of the machine. The plural speed drive mechanism and the reversing mechanism at the right hand side of the machine are not duplicated at the left hand side of the machine (looking forward) but instead the hub portion 151 of the gear 101 has a splined driving connection at 152 with a transversely extending shaft 153, which extends through seals 154 and 155 respectively at the right and left hand sides of the machine frame (looking forward) and which has a splined connection corresponding to the splined connection at the right hand side of the machine, with the sleeve 151' secured to the clutch housing 114'.

The sleeves 118 and 130 carry pivoted shipper elements 157 and 158 respectively, which are adapted to be moved to effect the application of pressure to the clutch and brake discs by means of reciprocable wedge elements 159 engaged and movable by a grooved collar 160. With this collar a shipper yoke 161 cooperates, the yoke 161 being carried on a rod 162 suitably guided, as at 163 and 164, in the frame or casing 40. The rod 162 is movable by a bell crank 165 pivoted at 166 on a vertical pivot stationary with respect to the housing 40; the arm of the bell crank coacting with the rod 162 having an adjustable connection therewith, as illustrated in Fig. 10, and the other arm of the bell crank being connected by a link 167 with an arm 168 on the outer one, 170, of a pair of coaxial shafts 169, 170, shown in Fig. 12. The shaft 169 is journaled near its end in a bracket 171 secured to the casing 76. The shipper mechanism for the clutch and brake mechanisms at the left hand side of the machine (looking forward) are similar to but reversely arranged as compared with those at the right hand side, and the corresponding but reversed bell crank associated with the mechanism at the left hand side of the machine is similarly operated through the center shaft 169 within shaft 170. The shaft 169 also has a bearing bracket 172 supported on the frame 40; and the shafts 169 and 170 have operator controllable levers 174 and 175 respectively.

As previously indicated, there is included in the mechanism as a whole, which for purposes of illustration is being shown in a form particularly adapted to room and entry operations, apparatus for disintegrating or removing a substantial section of coal from the face and delivering it onto the flight conveyor 78. This mechanism may obviously assume various forms but includes, as shown, a suitable frame mounted for swinging on a horizontal axis, driving means for the chains which are carried and guided on the frame, means for imparting predetermined, limited, advancing and retracting movements to the frame, means for swinging the frame, means for receiving the coal that the chain elements bring back as they separate it from the face, means for delivering the coal removed from the face through a turntable mechanism which is provided for the purpose of enabling the several chains to be presented to the face in a sufficient number of angular positions to remove the coal for the full width of the face, means for rotating the turntable, which turntable carries guides for a reciprocable frame supporting the disintegrating mechanism and the driving motor for the latter, and the hood or funnel which receives the coal from the chains and delivers it through the turntable and other mechanism later to be described in detail.

As will hereinafter be more fully apparent the disintegrating apparatus which I shall shortly describe in detail includes means for forming a relatively wide, shallow opening in a face, means for swinging the disintegrating apparatus at a rate suited to maximum rate of material detachment from the face, and means for moving back the disintegrating apparatus to a position for repositioning thereof for a new attack, such backward movement usually attended, except in very low coal, by the disintegration of a small wedge shaped mass of material.

As will be evident from the drawings and the preceding and ensuing description, the initial, sumping movement is of a relatively shallow depth. It may indeed be—and is so disclosed in this application—of such a depth that the distance which the bits, later described, traverse inside the face in rectilinear paths, after rounding the forward end of the disintegrating mechanism 23, is relatively quite short, being indeed, in the illustrative embodiment shown, only on the order of one-third of the width of the mechanism 23, when this mechanism is horizontal. And the tearing, as contrasted with cutting, of the material from the vein which attends the upward swinging movement of the mechanism 23 is in part obtained by this limitation of penetration, and in part by controlling the upward force exerted by the swinging means for this mechanism.

A free surface is necessary for the effective cutting or detachment of a mineral from a seam. When coal is cut by a cutter chain, the inclined bits have a limited penetration, due to the relatively great length of cutter chain in engagement with the coal and the limitations of the feeding force. Except at the mouth of the kerf, the only free surface is the surface forming the instantaneous forward boundary of the kerf. And the penetration of the bits is so small that the free surface that does exist at the face, as the bits emerge, is of little moment or effect. Each bit when cutting usually forms a groove wider than its width at the instantaneous free face just ahead of it, and removes the coal, by reason of the nature of the latter, by springing, or spalling off—so to speak—pieces bounded by surfaces diverging rearwardly from their intersection along a forwardly sloping line extending from the tip of the bit to the free surface and themselves intersecting the free surface along rearwardly diverging lines. The usual bit penetration being small, the disintegrated product, with a standard coal cutting machine, is relatively small, not much running above the size of pea coal. But with the bringing of the free surface of the face close to the point where the run of the chains becomes rectilinear, and close to the point where the bit faces in their curvilinear paths have their forward faces substantially parallel to the face, so that their push is normal to the face, and with the bits advanced in a manner to utilize their full penetration (see Fig. 61), there result conditions in which larger lumps are produced not only because the tips of the bits penetrate more deeply and thus increase the dimensions of the edges of the pieces of coal detached, but also because there is a new factor provided by the free face so closely related to the commencement of predominantly or wholly outward movement of the bits that a material fraction of the outermost band of coal will be broken out or torn out in the forms of lumps ripped outwardly through the standing face rather than in the forms of smaller fragments broken loose through the instantaneous top wall of the kerf.

To the removal of the coal in relatively large pieces substantial contribution may also be made by arranging the bits in transverse rows, whose width transverse to the median lines of such rows is relatively small compared with the distance between successive median lines, as thereby successive impacts, as distinguished from uniformly spaced attacks by individual bits, can be secured; and also because, in the removal of a body equal in length to the sum of the effective bit spreads of several chains, there will be only two, or, when there is a free side, only one lateral bond of the body to be overcome, so that, with four chains, the action of four bits will be available for overcoming a maximum of two lateral bonds.

There is still another factor which is utilized by the invention. The coal in a seam is under considerable pressure. When an opening is made at the bottom, an upright column of coal extending from the top of the opening to the roof and of a horizontal cross section generally similar to the horizontal projection of the opening is relieved of pressure, and it is believed that this relief of pressure introduces shear strains between the sides of this column and the adjacent body of the coal to which it is attached laterally and rearwardly and which is still under load, and also shear strains within the cross section of the column itself. It is believed that there is a sufficient change in the internal stresses of the column to set up important internal forces and leave the coal in condition to be more easily broken by the cumulative action of the bits as they move upward and outward during subsequent upswing to tear material from the face. If the coal is of a crystalline construction, as will frequently be the case, it is very likely that the failures may occur along crystal faces, and in any event, the fact that the coal is under stress would make it easier to break along cleavage surfaces regardless of the theory of coal structure entertained. Whether it is made up of cubical crystals or whether it is made up of horizontal strata having cleats between them but without vertical cleats in the virgin condition of the coal, it is believed to be clear that internal forces will be set up in the portion of the coal that is to be attacked by the bits in the upward (or downward) swing of the attacking instrument, and that these forces make it easier to tear off substantial pieces. It seems probable that the internal forces mentioned will facilitate diagonally upward and outward fractures during upswing of the attacking instrument, and this seems to be borne out in practice. Whatever the theory, and I will deal further with certain theoretical considerations at a later point in this specification, I take advantage of the actual phenomena by attacking the coal during swing by repeated impacts and relatively large bit penetration so that during the upward swing medium and large sized pieces are torn off of the face, and, following the detachment of a substantial sized piece, the attacking instrument continues to swing upwardly under the overlying (or downwardly over the underlying) ledge and pretty soon gets a good enough bite to tear off another sizable chunk, the surfaces of detachment being probably along upwardly and outwardly inclined zones that are already subject to internal stresses due to the bottom notch—stresses augmented by the continued upward and outward pounding of the bits, thus giving to the operation of the attacking instrument an altogether new and most efficacious and expeditious disintegrating action.

*The disintegrating apparatus, the means for supporting it for upward and downward swinging, the means for swinging it upward by power and for lowering it, and the means for driving the bit armed chains which provide the distintegrating action*

The means for severing, dislodging or tearing the coal from the face may best be seen in Figs. 1, 2, 17, 25, 30 and 31. This includes, as illustrated, a structure for supporting a number of chains for movement in orbits which are arranged in vertical planes, and in such proximity to each other that all of the coal for a width equal to the distance between the orbits of the most remotely spaced side bits will be removed from the solid and carried back by the chains. In the structure specifically illustrated, there will be noted at 180 a structure built up of plates 181 and 182 spaced from each other and secured together by plate elements 183, and there are clamped to the plates 181 and 182 by bolts 184, guideways 185, in the form illustrated, for four chains of the block and strap link type, the bit carrying blocks being illustrated at 186, the strap links at 187 and disintegrating instruments, herein the bits, at 188. This structure is connected to a fork-like element 189 (Fig. 25) which has short sleeve portions 190 and 191 which are received in bearings 192 carried at one side of the machine in a cylindrical portion 193 of a member 194 which is supported in an opening 195 in the side portion 196 of the frame 24, and carried at the other side in a cylindrical portion 193' carried by a gear housing 197. An end closure member 198 is secured to the member 194 as shown in Figs. 25 and 26.

In suitable anti-friction bearings 200 mounted inside of the sleeve portions 190 and 191 there is journaled a shaft 201 whose portions between the bearings 200 carry four chain driving sprockets $202^a$, $202^b$, $202^c$ and $202^d$, these sprockets being splined, as at 203, to the shaft 201. These sprockets may be variously arranged in the matter of their angular relation to each other, but a desirable arrangement is such that, through the formation of their individual splineways, each may be set slightly differently from each of the others, so that the bit blocks will carry their bits in transverse rows inclined to the planes of the chain orbits, the median lines of which rows perpendicular to the planes of the chain orbits being separated from each other by much more than the maximum width of the rows transverse to such median line, that is to say, by much more than the distance between lines parallel to said median lines and passing through the outermost points in the forward faces of the foremost and rearmost bits of each row. For example, by forming the splineways in the sprockets say 13½° ahead, 4½° ahead, 4½° behind and 13½° behind a given median line, desirable results may be obtained, in that there will be, as it were, spaced, but slightly deadened, impacts of the bits on the coal, and yet all of the bits in any given row can act concurrently to provide thrust on the coal as the bits move rectilinearly towards the face, if they each have penetration in the coal, and, when all have relatively full penetration and the coal is in condition for detachment of a substantial mass—either by reason of internal strains as later explained, or due to the pounding by the bit rows, pieces of substantial size may be torn off and moved out. Between each sprocket and the next there is mounted a paddle-carrying spacer disc or bladed impeller 205 of which the paddles or blades 206 serve for the more effective discharge of the coal. The chute portion 24 is a part of the elongated frame portion 22 hereinbefore mentioned, and the frame 22 has suitably bolted to it the motor 25, whose power shaft 208 carries a driving pinion 209. This driving pinion meshes with and drives an intermediate gear 210 rotatably supported by means of a shaft 211 journalled, as at 212 and 212', respectively, in the gear casing 197 and another casing element 213. The gear 210 meshes with a gear 215, and the gear 215 drives, through a shaft 216 common to the two gears, another gear 217, the shaft 216 being rotatably supported in bearings in the frame portion 197, and in a cover portion 219 carried by a frame portion. Gear 217 drives a larger gear 220 which, through a common shaft 221 supported similarly to the shaft 216, drives a smaller pinion 222, which in turn meshes with a relatively large gear 223 whose hub portion 224 is connected by a spline 225 to one element 226 of a coupling 227 whose other element 228 is connected to the element 226 by one or more shear pins 229. The element 228 is connected by a key 231 to the end of the shaft 201, to drive the latter.

Now it will be observed that the several chain sprockets $202^a$, $202^b$, $202^c$ and $202^d$ and the paddle equipped spacers or impellers 205 will be rotated by the shaft 201 through the following driving connections: shaft 208 of the motor 25, driving pinion 209, drive gear 210, drive gear 215, coaxial smaller drive gear 217, the larger drive gear 220 meshing with the drive gear 217, the smaller drive gear 222 turning with the larger drive gear 220, and the still larger drive gear 223 connected through the shear pin mechanism with the shaft 201. By assembling the gear 220 on the shaft 216 and the gear 217 on the shaft 221, as may readily be done with the construction shown and described, it will be possible to effect a drive of the chains at a much higher rate than with the parts assembled as shown; and many other gear combinations of proper pitch diameters can be used to get almost any desired chain speeds. A chain speed of 550 feet per minute is mentioned in the illustrative example hereinafter described.

The structure of the elongated frame portion 22 may now be somewhat further noted. It will be sen that it includes relatively widely spaced guide portions 235 which are connected together at their rear ends by a transverse frame portion 236 (Fig. 17), forwardly of which there is a large, generally circular opening 237 beneath the motor 25. Another transverse portion 239 extends between the opposite guide portions approximately midway of their length. Forwardly of the transverse portion 239 is a third transverse frame or web portion 241 which includes a generally arcuate, rearwardly sloping wall portion 242 which combines with the forward face of the transverse portion 239 to form an opening 240 which is elongated in a direction normal to the direction in which the disintegrating apparatus moves toward the material to be mined. The frame or web portion 241 also includes a forwardly sloping wall portion 244, which at its crest 243 joins the wall portion 242 and which slopes forwardly and downwardly in a double inclination and ends just to the rear of a vertical plane in which the axis of rotation of the shaft 201 lies. The forward end of the wall portion 244 forms the rearward boundary of a second discharge opening 240ª which exists in advance of the discharge opening 240 when the frame 22 is in its rearward position. The guide portions 235 are shaped to cooperate with other guides 21 formed on the turntable element 20.

Projecting upwardly from the transverse portion 239 there is a wall 239ª which extends across the frame and then forwardly adjacent the sides of the latter and which cooperates with the frame or web portion 241 to form the discharge hood or chute section 24, which is spaced from and surrounds the rear portions of the orbits of the chains, and this discharge hood or chute section communicates through the opening 240 formed between the transverse portions 239 and 241 with the space below the reciprocable frame, and specifically with the opening later described in the turntable 20. With the hood or chute section 24 there cooperates an upwardly and downwardly adjustable hood section 245 having annular bearing portions 246 journaled on the exterior of the sleeve portions 193 and 193'. To the adjustable hood section 245 there is bolted or otherwise secured at each side thereof a serrated positioning plate 247, and a notched bar 248 (see Figs. 2 and 17) is carried at the top of the hood 24 and may be engaged in different ones of the spaces 249 between the serrations of the serrated plates 247 to hold the adjustable hood section 245 in the desired position. By moving the bar, to move its notch 248' opposite one of said serrated positioning plates and to withdraw the end of said bar from engagement with the other of said plates, adjustment of the hood section 245 may be made, and then by longitudinal sliding of the bar and fixing of it relative to the hood 24, the hood section 245 may be locked in adjusted position. For the purpose of counterbalancing the weight of this adjustable hood section, a spring 250 is arranged to extend between a pivoted abutment element 251 mounted on the side of the hood section 24 and a trunnion-carrying ring 252, whose trunnion pins 253 are received in notches 254 in a bracket member 255 secured to the forward edge of the adjustable hood section 245. A tubular spring-supporting element 257 is suitably secured, as by welding, to the abutment member 251 and extends through an opening in the trunnion carrying ring 252 when the adjustable hood section 245 is moved counterclockwise in Fig. 26 to lower its height. Associated with the adjustable hood section 245 is the breaker or sizing means for breaking up or sizing any large lumps, and this means includes a series of breaker lugs 258 secured to the upper wall of the hood section and projecting inwardly toward the chains. The lugs cooperate with the chains so that any large lumps carried back by the chains are engaged by the breaker lugs and thus reduced in size, so that they may readily pass through the chute to the turntable hopper. These lugs may desirably be generally triangular in shape, with the shorter sides of the triangles more or less perpendicular to the travel of the lumps at the moment of impact of the lumps thereon, and may desirably be sufficiently numerous to permit the location of a lug opposite each chain guideway, at least.

It will be observed that secured to the opposite sides of the side frames of the gang of chains there are plate elements 260 having rearwardly extending arms 261 to which there are pivotally connected, by pins 262, the forward ends of pitmen 263 whose other ends are pivotally supported on the wrist pins 264 of piston structures 265, each of which is reciprocable in a bore 266 of a cylinder structure 267. There is one of these cylinder structures bolted, as at 268, to each of the side frame portions 235, and slotted front cover plates 270 are secured to the forward ends of the cylinders and provide slots 271 in which the pitmen 263 are swingably and reciprocably movable. The rear head 272 of each cylinder structure 267 has an inward projection 273 whose face is radially slotted, as at 274, and which is traversed by an opening 275 to which a fluid supply conduit 276 extends. A projection 277, having a tapered end 278, is secured to each piston structure 265 for movement with the latter, being formed integral, as shown, with a plate 279 between which and the main body of the piston structure a packing 280 is clamped. The projection 277 is small enough to enter the opening 275 without completely plugging the latter, but yet is of such relative size that it provides a very efficient throttling of the escape of fluid from the chamber within the cylinder structures to the left of the piston structures 265 in Fig. 29, and thus aids in bringing the chain gang to rest in lowered position without excessive shock. The control of fluid to the conduits 276 will later be explained. The working area of the piston structures 265 and the hydraulic pressures to which they are subjected are such as to effect, in the illustrative example hereinafter described, swing through a height of about 5 feet in a period of about eighteen seconds against the resistance opposed by the disintegration of the coal. It is apparent from the foregoing that the cutter bar will be moved substantially constantly by the piston structures 265 at a rapid rate.

Along the opposite sides of the gang of chains there extend outwardly diverging side boards 281 which increase in width toward the rear end of the chain gang. These, by virtue of their mutually outward inclination and their increasing width, form a trough of increased carrying capacity as they approach the rear end of the gang of chains. These do not extend at maximum height completely to their rear ends, but are cut away as at 282 so as to allow their rear ends to enter the mouth of the adjustable chute section 245. This arrangement prevents the dislodged coal from falling off the top runs of the chains and, through the increase in carrying capacity towards the mouth of the adjustable chute section 245, provides insurance against lateral escape of coal in the event that any lumps entering the throat of the chute section temporarily partially obstruct the discharge down through the turntable, as later described.

*The turntable mechanism and the devices for supporting, feeding and retracting, and changing the angular relation in horizontal planes of the disintegrating apparatus to the line of advance*

Underlying and supporting the elongated frame 22 there is, as has been previously noted, a turntable element generally designated 20, which turntable element is mounted on the frame 15 for rotation on a vertical axis and carries guides 21 for cooperation with the guide portions 235 of the elongated frame 22, and also supports mechanism for effecting the reciprocation of the elongated frame 22 relative to the turntable and so to the base of the machine on which the turntable is supported. This turntable element 20 includes a circular portion 285 which is rotatably supported upon the turntable bearing 17 carried integrally by the frame 15. The circular portion 285 has a circular open centre 285a which communicates with a larger opening 285b, with which the discharge opening 240 previously mentioned, communicates. The opening 285b is of a dimension, crosswise of the disintegrating apparatus, greater than the corresponding dimension of the discharge opening 240; and the discharge opening 240 is of a dimension, in the direction in which the disintegrating apparatus moves towards the material to be mined, which is less than the corresponding dimension of the opening 285b, the latter opening being so formed that during the movement of the disintegrating apparatus towards and from the material to be mined the discharge opening 240 will at all times be in a position to discharge to the open centre 285a of the turntable structure. Said second discharge opening 240a, which exists in the rearward portion of the disintegrating apparatus between the forward edge of the wall portion 244 and the forward boundary of the opening 285b in advance of the open centre 285a, is in discharge relation with the open centre 285a while said opening 240a subsists. When forward movement of the frame 22 extinguishes the opening 240a, material passing over the forward end of the wall portion 244 is directed by the upper forward surface 285c of the circular portion 285 of the turntable, towards the conveyor means. The sloping walls of the turntable element 20, extending between the openings 285b and 285a, form the periphery of a hopper for receiving disintegrated material from the opening 240 in all positions of the latter. The turntable element has a frusto-conical surface 286 which overlies a correspondingly shaped surface 287 on the frame 15, and the weight of the turntable is supported on the turntable bearing 17, while the turntable is held against lifting relative to the bearing 17 by an underlying ring structure 289 which is made in two or more pieces, and has a radial flange portion 291 which underlies the bearing ring 17 and an upstanding sleevelike portion 292 which has a shoulder portion at 293, which interlocks with a matchingly shaped shoulder portion 294 on a depending flange 295 formed integral with the turntable element 20 so that the turntable is very rigidly held down upon its seat on the turntable bearing 17. The arcuate members 289 are suitably secured to the turntable element by suitable means such as the screws 296 (Fig. 17). By this construction, dependence on the screws 296 to hold the turntable against lifting is avoided. A filler ring F is shown between the bearing 17 and the flange 291. An annular groove 297 is formed on the periphery of the multipart ring structure 289 to receive a cable, later described, for use in effecting turntable rotation. At the opposite sides of the turntable member 20 are the integral guideways 21. These have inverted L-shaped upper portions 298 providing outwardly extending horizontal flange portions 299 upon which rest adjustable gibs 300 secured to the elongated guide portions 235 and made adjustable relative to the latter by the push and pull screws shown in Fig. 35, and respectively numbered 300a and 300b. Between the rear ends of the guideways 21 a web 301 extends. To this web there is secured, as by screws 302, a thrust member 303, at whose rear end there is an upstanding portion 304 providing ears 305 to which piston rods 306 are secured. Upon these piston rods there are mounted pistons 307 which are disposed in cylinders 308. The latter are connected together by a bar 309 which is clamped, as by a flanged block 310 secured in place as by screws, to a part of the transverse portion 239 of the elongated frame portion 22. The heads 311 of the cylinders 308 engage an upright surface 312 formed on a depending portion of the transverse portion 239. The bores of the cylinders 308 are connected in communication with each other at their ends adjacent the surface 312 by a cross pipe 313, and fluid can be supplied to this end of the cylinders by a conduit 314 opening into the left hand cylinder, looking forward. The other ends of the cylinder bores are also connected in communication with each other by a cross pipe 315; and a conduit 316 is provided to supply pressure fluid to move the cylinders rearwardly with respect to the piston rods. A cable clamp 317, later referred to again, is secured as by screws 318 to the bottom of the transverse web 301. The lengths of the cylinders 308 is such that they have a feeding and retracting range on the order of 18 inches in the illustrative embodiment disclosed, and their areas are such as, under the hydraulic pressures available, to effect sumping, in the illustrative example hereinafter described, in about 8 seconds and retraction in about 4½ seconds.

*The body structure, the primary chain conveyor, the mine floor cleaning arrangements, the mounting for the turntable thereof, the turntable rotating and braking arrangements, etc.*

From what has already been said it will be appreciated that the elongated body 11 is supported near the rear end of the tractor mounting by the transverse support member 12 which is bolted to the top of the body 11 and bolted at its ends to the tractor frames, and that at the forward end of the body there are the laterally extending feet or foot members 13 which also rest upon the tractor frames and have angularly related portions which engage and are secured to the mutually adjacent sides of the tractor frames. By means of this construction, the body 11 may be arranged in a low position, thus reducing the overall height of the machine by supporting the body mounted parts in correspondingly lower positions.

The body 11 may desirably be of welded construction and has its interior divided into a relatively shallow lower chamber 320, and a considerably higher material conveying chamber 321, by a partition 322. The flight conveyor chain 78 is adapted to travel rearwardly over the top of the partition 322, and forwardly beneath the partition while resting on the bottom wall 324 of the body 11. The drive for the flight conveyor chain has been described hereinabove.

The front end of the main frame pivotally supports a shovel and nose piece arrangement which is of welded construction as illustrated and is generally designated 325. This includes a guide structure 326 about which the forward end of the conveyor 78 passes and which is arranged opposite the mouth of the passage 321; and at either side of the frame and guide structure 326 there are laterally extending curved plate elements 327 forming a part of the swinging structure and curved to cooperate with scroll elements shortly to be described. The front end of the frame member 11 has secured to it a transversely extending, forwardly projecting frame structure 328 which includes, as shown, a rear pivot mounting 329 for a piston and cylinder mechanism 330, the end of which not connected to the pivot mounting 329 is connected at 331 to a plate element 332 which is welded to other parts of the structure 325. The rear pivot mounting 329, the piston and cylinder mechanism 330 and the connection 331 to a plate element 332 may be duplicated at opposite sides of the main conveyor, the two cylinder and piston mechanisms then receiving fluid or being vented, as the case may be, through a common main conduit. The structure 325 is pivotable about a horizontal axis at 333, upon bearing means supported by forward projections 334 upon the transverse frame structure 328. Several—herein seven—curved shoes S underlie the forward end of and are arranged at the bottom of the structure 325 to serve as runners. "Flapper" plates 336 are hingedly connected, on the hinge line 337, to the frame 11 by means of suitable bearings. They cover the exposed spaces laterally between the sides of frame 11 and the outside lines of the machine and longitudinally to the rear of the plates 327. To prevent escape of material off of the edges of the conveyor, cooperating plates 338, 339 and 340 are provided at each side of the conveyor. Plates 338 are secured to and form a part of the swinging structure 325 and are arranged just outside the lateral edges of the conveyor and at the adjacent edges of the plates 327. To the frame structure 328 there are secured the plates 339, and the plates 340 secured to the plates 339 overlap with the rearward edges of the plates 338 which, as will be understood, swing relative to the plates 339. Helical conveyors or scrolls 341 are supported by shafts 342 which are rotatable by sprockets 343 which are engaged and driven by the roller side chains 344 of the flight conveyor 78, which may be noted to include transverse flights or bars 345 supported by suitably spaced links. The outer ends of the shafts 342 are supported in bearing supports 346 bolted to pads on the plates 327. The plates 327 are curved, as above noted, to cooperate with the scrolls or helical conveyors 341. As shown in Fig. 33a, a triangular mounting plate 346' may be substituted for the angular mounting 346 if only the scrolls mounted on the shafts 342 are to be employed. Truncated-cone shaped members D at the adjacent ends of the scrolls operate to facilitate the movement of material being forced centrally by the scrolls, onto the front end of the main conveyor. To clean up the loose material from the mine bottom between the sides of the crawlers and the ribs, extension scrolls 341E may be connected by universal joints 347 with the ends of the shafts 342 which support the scrolls 341, and plates 327E constituting, in effect, extensions of the curved plates 327 may be pivotally connected to the latter by pivot pins 348, and resilient connections 349 pivotally connected between the crawler frame and the outer ends of the extension plates 327E normally crowd the lateral cleanup devices forwardly, but allow them to yield when an obstruction is encountered.

With reference to Fig. 18, it will be observed, noting the section upon which this view was taken, that the passage 321 is widened at its forward end as at 350 and has its walls reinforced or thickened to support the weight of the turntable element 20 and the parts which the latter supports. The walls 350 flare above the plane of the section of Fig. 18 to provide a circular opening at the turntable bearing 17. Pads 351 and 352 are provided on the sides of the body 11 just to the rear of the transverse axial plane in which the axis of turntable rotation lies for the mounting on the sides of the body of turntable rotating cylinders 353 and 354. These cylinders are of similar construction and each has a closed forward end 355 and an open rearward end 356. Each contains an elongated piston 357 whose "rod" is of the full diameter of the bore of the associated cylinder. Each piston rod is hollow and has central within it a tube 358 into which a spring 359, resting at its other end on the cylinder head, extends; and the rearward end of each spring rests on an abutment 360 held in spaced relation to a transverse wall 361 upon which, at the rear end of the respective piston rod, there is mounted a support 362 for a transverse shaft 363 upon which a series (three as shown) of sheaves are rotatably supported. The forward cylinder head has rigidly fixed to it a frame upon which, upon a relatively rearwardly supported shaft 364, there are supported two sheaves similar in size to the three rearward sheaves, and a shaft 365 disposed forwardly of the shaft 364 and slightly higher carries rotatably thereon a larger sheave so positioned that its pitch circle is tangent to the pitch circle of the groove 297 previously mentioned. The cable sheaves at the rear of the cylinder 353 are, numbering from the side of the frame 11 outwardly, identified as 371, 372, 373. The corresponding sheaves associated with the cylinder 354 are 371', 372' and 373'. The two sheaves ahead of and nearer the cylinder 353 are 374 and 375, while the corresponding sheaves at the other side of the machine are 374' and 375'. The larger sheaves are 376 and 376'. Conduits 377 and 378 are provided to supply fluid to the cylinders 353 and 354 respectively. A cable clamp is supported by each of the cylinders 353 and 354, the one at the right of the machine, looking forward, numbered 379, the other 380. Each is adjustably mounted by means of a threaded rod 381 and associated nuts 382 and 383, each of said rods passing through bored lugs or bosses on its associated cylinder and cylinder head. The cable clamp 317, it will be recalled, is fixed to the turntable element, so that angular movement of the clamp 317 will be attended by angular movement of the turntable. A cable 385 has its ends fixed to the cable clamps 379 and 380 and its center to the cable clamp 317. It is reeved as follows: from the cable clamp 379 rearwardly over the sheave 371, forwardly and around sheave 374, rearwardly over sheave 372, forwardly around sheave 375, rearwardly over the sheave 373, forwardly around sheave 376, rearwardly around groove 297 on the turntable to the cable clamp 317, from the latter forwardly and over sheave 376', rearwardly around sheave 373', forwardly over sheave 375', rearwardly around sheave 372', forwardly over sheave 374', rearwardly around sheave 371' and forwardly to cable clamp 380. Admission of fluid to conduit 377 will cause counterclockwise rotation of the turntable in Fig. 18; to conduit 378, clockwise rotation. The springs 359 normally act to keep slack out of the cable.

To hold the turntable element 20 firmly against rotation except when it is desired to turn it, brake or lock devices are mounted on the frame 11 just beneath the ring flange 291. These brake devices may be either of the hydraulic pressure applied type or of the spring applied, hydraulic pressure released type, and I have shown the latter. These two devices are numbered 391 and 392 respectively, and each is secured by flanges 393, welded to it, to the side of the passage forming section 15 and to the turntable bearing portion thereof, 17. These flanges rest at their lower ends on the upper surface of the wider part of the frame 11, as shown in Fig. 16. Each of these cylinders contains a piston 394 on which a suitably heavy, brake applying spring 395 acts. The lower end of each spring engages a lower surface which may be fixed, or adjustable, with respect to a cylinder 396 in which the piston 394 is reciprocable. The tops of the pistons each have a rod 397 fixed to them and which extends through a suitable gland 398 carried by the top of the cylinder and supports a head 399 carrying a pad 400 of brake material which the spring 395 is adapted to force against the flange 291. Conduits 387 and 388 are provided to deliver hydraulic fluid to the devices 391 and 392 respectively, and to vent such fluid. When fluid is supplied, the turntable is free for turning; when fluid is vented, the springs exert their pressure through the brake material pads 400 on the flange 291 and the turntable will be locked or braked. Further details of the hydraulic control of these brakes will be later provided.

To hold the machine stable during sumping and withdrawing, it is provided with a pair of jacks, one adapted to engage the mine bottom and the other the mine roof. The first mentioned jack, 401, is mounted by means of a bracket 402 on a suitably positioned surface 403 rigid with the frame 11. This jack includes a vertical cylinder 404 containing a piston 405 having a piston rod 406 adapted to be forced downward by fluid supplied to the cylinder through a fluid line 407. The piston rod carries, at its lower end, a floor engaging plate element 408. Retraction of the piston, to raise the plate element 408, is accomplished by fluid through a fluid line 409, the supply through the line 407 being interrupted and the upper end of the cylinder being vented, of course, at this time.

The upper roof engaging jack 410 includes a cylinder 411 containing a piston 412 whose piston rod 413 carries a pivoted, spring positioned roof-engaging member 414. The roof-engaging member 414 is pivotally carried by an intermediate rod section 415, which may be fixed in various relative positions to the piston rod 413 by a pin 416 and suitably spaced holes 417. Fluid may be supplied beneath the jack piston 412 by a conduit 418. The jack 410 has its cylinder pivotally supported at 419 on a bracket 420 mounted on top of the frame 76. Springs 421 are provided to retract the piston 412 and supported parts and to hold the jack upright in use, and to permit its being laterally swung if and when it strikes the roof as the machine is tramming. Springs 422 normally maintain the roof engaging member horizontal when the roof jack is vertical, but may yield as roof engagement tilts the member 414. These jacks 401 and 410 may evidently augment the friction of the tractor treads on the mine bottom in holding the machine base stationary during sumping and withdrawing, and at least the jack 401 also plays a very important function in enabling the machine to follow the vein and avoid running up out of the latter. Further, the bottom jack 401 is very effective to hold the machine on an even keel when sumping, as well as to maintain the same height for the start of each sumping operation. Without the jack, the relatively short crawler treads make it difficult to hold the machine on a given level or slope. The center of gravity of the machine is toward the rear of the crawler treads, and with the uneven floor and presence of some loose coal that gets under the crawlers, there is a tendency for the front end of the machine to tip up as it progresses along the mine floor. The bottom jack is used to bring the machine to the same level or angle of slope at the commencement of each sumping operation. This enables the operator to keep the floor and ceiling surfaces of the coal relatively even. The upper jack 410 is useful by itself to force the rear end of the machine down when commencing a sumping operation, if this is necessary to maintain the desired floor level, and may be used for stability during the making of the swinging movements of the disintegrating apparatus. Of course, the center of gravity might be located ahead of the center of the crawlers, in a modified design, in which event the jacks might be relocated, or perform functions the opposite of those they now perform.

It is desirable to maintain the roof level the same from side to side of the entry or room in which the apparatus is working, and it is frequently desirable to maintain the roof level uniform for substantial distances, and, in order to accomplish these objectives, I have provided means for automatically interrupting, at desired times, the supply of fluid to the conduit 276 leading to the upward swing cylinders 267 for the disintegrating device, which cylinders contain the pistons 265 which act through the connecting rods 263 upon the frames 261 to raise the disintegrating mechanism. This is accomplished by providing, in the conduit 276, a valve which is movable downwardly to interrupt the delivery of fluid through the conduit 276, but which, as will later be described, will permit venting of the fluid from the cylinder bores 266, even though in the position of the controlling valve mentioned no further fluid could be delivered into these bores. Evidently, if means be provided for interrupting the flow of fluid through the conduit 276 each time the upwardly swinging disintegrating apparatus has its point attain to a predetermined elevation, a uniform ceiling level can be obtained, and, if means be provided whereby the elevation of the highest point in the disintegrating apparatus at the time the fluid to the disintegrating apparatus elevation cylinders is to be cut off can be varied, then any (reasonably) desired roof level can be maintained. This is accomplished by the mechanism shown in Fig. 26, and in detail in Figs. 36, 37 and 38. It will be noted that a valve mechanism of the type mentioned, numbered 570, and later more fully described, is mounted upon the reciprocable frame 22, and that a bell crank device 431 is pivotally mounted, as at 432, upon a bearing member projecting laterally from the side of the hood 24. This bell crank element 431 has a plate portion 433 which is adapted to engage and thrust downwardly a valve-actuating element which forms a part of the valve mechanism 570. The bell crank has connected to it a trunnion supported sleeve 434, pivotally connected as at 435 to the more forward lower corner of said bell crank. To this member 434, there is fixed a nut 436 with which a screw 437 is interengaged. The screw is formed on one end of a rod 439 carrying a head 440 upon which a spring 441 enclosed within a tubular member 442 acts. This tubular member is received in the eye of a pivot member 443 pivotally supported as at 444 on a rearwardly extending arm device 445 welded at its forward end to the arm portion 261. A handwheel 446 is fixed to the member 439, and is normally held by the action of the spring 441 on the rod 439 against a forward head 447 of the tubular member 442, the rod 439 extending through an opening 448 in this front head. It will be obvious that, as the disintegrating device or chain gang swings upwardly, there will be a forward arcuate movement of the pivot 444. This will be attended by a forward movement of the tubular member 442, and, accordingly, the threaded rod will act upon the trunnion element 434 and pull the bell crank 431 in a direction to cause the plate 433 to actuate the valve to effect an interruption of the supply of fluid to the disintegrating apparatus raising cylinders 267 at a predetermined time. This time can be varied by changing the relation of the threaded rod portion 437 to the nut 436, as may be done by turning the handwheel 446. Evidently, no injury to the parts will be possible, because the spring 441 is present as a yielding protective device.

It is also desirable to maintain a level mine bottom, and to vary that level when desired, and so I have included means for limiting the extreme downward position of the tip of the disintegrating apparatus, and provided, as a supplement to the means heretofore described for securing a gentle termination of the downward swing of the disintegrating apparatus, an adjustable abutment or stop means for predetermining precisely the lower limit of the swinging movement of the disintegrating apparatus. Figs. 39, 40, 41 taken with Figs. 25 and 26 clearly show this arrangement. It will be observed that the projection 277 is of substantial length, to enable the securing of a dashpot action at different points in the lowering of the disintegrating apparatus. The chain gang structure has formed in its opposite sides recesses in which handwheels 450, mounted on the opposite ends of a transversely extending shaft 451, are accessible. This shaft, which extends transversely through the chain gang, has portions near its opposite sides, at 452 and 453, which are oppositely threaded, and which cooperate with correspondingly threaded nut elements 454 and 455 respectively. These nut elements are journaled in the spaced upper arms 456 of offset-type bell cranks 457, each of which has a lower leg 458 substantially at right angles to a line parallel to the associated upper pair of arms. These offset bell cranks are suitably journaled on bearing rods 460 supported at their upper and lower ends in the box-like structures 260. The lower legs 458 are pivotally connected, as at 461, to fork members 462 connected to the forward ends of stop rods 463 which are slidably mounted in the rearwardly extending arm portions 261 and which carry stop members 465 at their rearward ends. These stop members are provided with rubber or other suitable resilient face portions 466 and are adapted yieldingly to engage plane surfaces 467 formed on the forward heads of the cylinder elements 267. It will be obvious, from the arrangement of the parts shown in the figures mentioned, that when the abutment or stop elements 465 have their resilient facings come against the surfaces 467, as the chain gang swings downwardly, the rods 463 will be placed under compression and exert through their offset bell cranks tendencies to swing the upper arms 456 apart. This will place the rod 451 under tension, but, as its loading will be one of tension, it will carry safely the loads which will be imposed on it, and so the downwardly swinging chain gang will be brought to a dead stop by the engagement of the facings 466 with the surfaces 467. It may again be observed that, because of the dashpot construction associated with the cylinders 267, there will be little velocity left at the time this stop action takes place. Of course, by adjusting the position of the nut elements, by rotating the transversely extending shaft 451, as is possible from either side of the machine, the position at which downward chain gang swing will be terminated can readily be adjusted.

While a delivery conveyor is not an essential part of the apparatus described, it is a useful adjunct when loading is to be done. A portion of such a tail conveyor is illustrated at 471 in Figures 1 and 2.

Hydraulic system

From the foregoing description it will be seen that there are, including a tail conveyor elevating cylinder 499, when a tail conveyor is used, eight hydraulically controlled mechanisms which are to be made operable under the control of the machine runner to meet various contingencies and to perform various necessary operations. These include the two chain gang raising cylinders 267. These are single-acting cylinders; and they may have fluid supplied to them and vented from them through a branched connection of conduit 276 communicating with a common supply and exhaust line 569. There are also the sumping and withdrawing cylinders 308. There are two of these, and they are double-acting. Fluid is supplied to the forward ends of these cylinders to effect sumping and to the rearward ends to effect withdrawal. A single line 314 supplies and vents fluid relative to the front ends of both cylinders; and a single line 316 supplies and exhausts fluid with respect to the rearward end of these cylinders. There are also the pair of swing cylinders 353 and 354. These are single-acting cylinders, and fluid is supplied to them one at a time, one of these cylinders being vented while the other is having actuating fluid delivered to it. The fluid conduits for the cylinders 353 and 354 are numbered 377 and 378 respectively. There are two turntable brake devices 391 and 392. These have fluid supplied to their cylinders 396, 396 concurrently, and when fluid is to be vented from them they are simultaneously connected to exhaust. Their common fluid conduit is 492. These brake cylinders may be controlled entirely independently of all of the other cylinders, or they may have a control device associated with them which is so connected with the control for the swing cylinders that the brakes are automatically applied when the supply of fluid to both of the swing cylinders is cut off, and that the brakes are automatically released when fluid is supplied to either of the swing cylinders. As will be recalled, these brakes may be spring applied and hydraulic pressure released, and this arrangement is used in the arrangement shown in Fig. 42, with the result that the controlling valve for the supply of fluid to the brake cylinders can be manipulated to vent these cylinders and then moved into central position to provide for the avoidance of back pressure on the pump whenever this operation is desired. Mechanism for lifting the front end of the gathering conveyor and the scrolls is provided in order that these parts may be raised during tramming. This mechanism includes a single-acting cylinder 330—or there may be a pair of these—and since it is desired that the nose section of the conveyor 78 and the scrolls simply ride in contact with the bottom, an arrangement is provided at 571 to make this possible. It will be noted that this includes a chamber forming element 572 in whose cylindrical bore 573 a piston valve 574 is reciprocable. The spools of this valve are separated by such a distance that when these are in the position shown in Fig. 42, there may be connected the fluid line 575 leading to the front end of the single-acting cylinder 330 (or to the front end of each such cylinder, when a pair is used) and a connection 576 leading back to the reservoir, later described, from which hydraulic fluid is pumped to effect operation of the hydraulic operating devices. Connections 577 and 578 lead from the control valve for the cylinder 330, later more fully described, and enter the opposite ends of the valve casing 572. Since either end of this casing may therefore be supplied with fluid under pressure while the other is connected to exhaust, and then have the fluid which has been admitted to it trapped in it by allowing the primary control valve to move to neutral or central position, it will be clear that, when it is desired to do this, fluid may be supplied to the front end of the cylinder 330 to lift the scrolls and the front end of the conveyor 78 and maintain them in raised position; or the front end of this cylinder may simply be continuously connected to the reservoir, with the result that the devices which it is capable of lifting may simply rest in contact with the mine bottom. The bottom jack mechanism 401 is a double-acting mechanism, as has been explained, and fluid is supplied to raise the jack out of contact with the mine bottom through the connection 409, and to force the jack solidly into contact with the mine bottom and to elevate the rear end of the main frame of the machine, when this is desirable, through the conduit 407. The top or roof jack 410 is a single-acting device, and fluid may be supplied to its lower end by the conduit 418, which also serves for the venting of the pressure from this jack. The tail conveyor has the single-acting cylinder 499 for raising its delivery end, and fluid may be supplied to and vented from this cylinder by the conduit 504.

Appropriate controls for the various devices which have been described may obviously assume different forms, and I shall now describe a control system making use of conventional valve devices of a character which permits the avoidance of substantial back pressures on the hydraulic pump at all times except when power is required for effecting the operation of a controlled mechanism. Various modifications of the controlling apparatus may be made, and two will be shown later in the series of drawings and described later in this specification.

As previously stated, I am showing in Figs. 43 to 45, a conventional control valve unit 601 consisting of a supply and relief valve section 602, eight control valve sections, respectively numbered 603 to 610, and a discharge section 611. The valve sections 603 to 610 respectively control the hydraulic mechanisms above enumerated, in the order, in which they are enumerated. These may be repeated here, however, as follows:

| Valve mechanism: | Controls |
|---|---|
| 603 | Disintegrating mechanism raising cylinders. |
| 604 | Sumping and withdrawing cylinders. |
| 605 | Lateral swinging cylinders. |
| 606 | Brake cylinders. |
| 607 | Conveyor nose lifting cylinder (or cylinders). |
| 608 | Bottom jack. |
| 609 | Top jack. |
| 610 | Tail conveyor raising cylinder. |

A reservoir 615 serves as a source of operating fluid for the various hydraulic operating mechanisms. A suction connection 616 leads to a suitably driven pump 617, herein the pump driven by the shaft 39. The pump discharge line 618 leads into the valve section 602 and communicates with a chamber 620 in such section. It will be observed that the several sections 602 to 611 are all suitably held together, as by bolts B. The section 611 has a chamber 621 connected by an exhaust line 622 back to the reservoir 615. The section 602 has a second chamber 623 in it, and a differential-type relief valve 624 is movable, when the pressure in the chamber 620 exceeds the desired supply pressure, against the action of a spring 625 to connect the chamber 620 with the chamber 623, and so with the return line 622 to the tank 615, for, as will be observed, there is provided between the chamber 623 and the chamber 621 a continuously open passage including an opening 626 formed in the section 602 and a series of identical exhaust chambers 627 in communication with each other, the first communicating with the opening 626 and the last (the one in the section 610) communicating with the chamber 621. At the other end of each of the sections 603 to 610, as may be seen by reference to Figs. 43 and 44, there is another exhaust chamber, 628. These are connected with one another and the last (the one associated with the section 610) is connected by a passage 630 with the chamber 621. The chamber 628 in the section 603 does not, however, communicate with the chamber 620, but is blanked off from the latter.

Each of the various sections 603 to 610 has associated with it a multispool control valve element 631, each having a control lever 631' pivoted on a bracket attached to its valve box section, and each valve includes relatively long end spools 632 and 633 and relatively narrow spaced central spools 634 and 635. Spools 632 and 634 are separated by a groove 636; spools 634 and 635 are separated by a groove 637; and spools 633 and 635 are separated by a groove 638. Devices of conventional form for returning each of the valves to its central position are shown in the form of springs 639 and spring abutments 640 having feet 641 which engage surfaces 642 in the valve casings to limit the action of the springs when the respective valve elements reach their central positions. The valve 631r controls the raising cylinders 267 for the disintegrating mechanism; the valve 631f controls the sumping and withdrawing cylinders 308; the valve 631s controls the lateral swing cylinders 353 and 354; the valve 631b controls the brake devices 391 and 392; the valve 631n controls the lifting cylinder 330 for the conveyor nose, the valve 631bj controls the bottom jack 401, the valve 631tj controls the top jack 411 and the valve 631c controls the tail conveyor raising cylinder 499.

Each of the sections 603 to 610 provides a pair of spaced supply grooves 643 and 644, each of which opens through the side walls of the section by suitable passage means 645. The passages 645 at the left side of the valve casing 603 communicate with openings 647 and 648 in the casing section 602. All of the supply grooves 643 are in communication with each other, and all of the supply grooves 644 are in communication with each other, so that fluid, at whatever pressure the pump 617 may be delivering, is always available in any of the grooves 643 and 644. It will be noted that wall portions 650 and 651 of the casing 611 prevent communication of these supply passages with the chamber 621. Means is also provided for permitting, so long as the several valve elements 631 are in their respective central positions, the free flow of fluid from the chamber 620 to the chamber 621, but each valve element 631 is operative, when it is moved to supply fluid to the cylinder or cylinders which it controls, to interrupt this free flow-through. This arrangement may be readily understood by noting that the section 602 has a passage 655 opening into a passage 656 in the valve casing 603, and that the passage 656 is connected, in the median position of the valve element 631 which is associated with this casing, by an opening 657 with a passage 658, which communicates with a passage identical with the passage 656 but in the next adjacent valve casing element 604. This system prevails throughout the several sections 603 to 610, and the section 610 has a passage corresponding to the passage 658 which opens through a passage 660 into the chamber 621. When any one of the eight valves 631 is moved a distance sufficient to bring either its spool 634 or its spool 635 into the opening 657, the free connection of pump delivery line with the return line to the tank is interrupted, and the pressure immediately builds up to the value determined by the setting or loading of the relief valve 624. One more set of connections associated with the several valve casings exists. Substantially midway between the exhaust chamber 627 and the supply chamber 643 there is an annular chamber 663, which may be connected with a conduit leading to a device to be controlled. Likewise midway between the supply conduit 644 and the exhaust conduit 628 there is another annular chamber 664 which may be connected with another conduit leading to a device to be controlled. When double-acting mechanisms are controlled, the chambers 663 and 664 are connected with the opposite ends of such mechanisms. When single-acting mechanisms are controlled, whichever one of the chambers 663 or 664 may not be desired to be employed, is simply closed off by a plug.

The conduit 569 leading from the section 603 to the branch conduit 276, which enters the ends of the raising cylinders 267, passes through the valve mechanism 570 above referred to, which includes casing elements providing a chamber 671 in which a two-spool valve 672 is reciprocable. This valve is normally held, as by a spring 673, in a position to connect the two sections of the conduit 569, but is adapted, when depressed, to cut off communication between these conduit sections. The valve mechanism 570 includes annular chambers 674 and 675, respectively connected to the portion of conduit 569 which is connected to the valve device 603 and to the portion of the conduit 569 which leads to the branch connections 276 to the cylinders 267; and these annular chambers 674 and 675 have communicating with them respectively, chambers 676 and 677, separated by a valve seat 678, on which there is guidedly supported a check valve 679. This check valve prevents flow from the chamber 674 to the chamber 675 via the passages 676 and 677, but when the chamber 674 is connected back to the tank 615 by the valve device 601, the fluid in the raising cylinders may be displaced through the chamber 677, past the check valve 679, through the passage 676, through the annular groove 674, and back through the device 601 and through the conduit 622, to the tank, even though the valve 672 cuts off connection between chambers 675 and 674 through the chamber 671.

The mode of operation of the system described will be readily understood. Let it be assumed that the apparatus has been brought into such relation to the working face that the forward end of the disintegrating apparatus, in the retracted position of such disintegrating apparatus, is closely adjacent to the center of the working face. As it may be desired to start the operation at the left hand rib, the valve 631s of the valve unit 605 will be manually operated to admit fluid to the conduit 377, thus supplying fluid to the cylinder 353, and, in an obvious manner, bearing in mind what has been already described, causing the disintegrating apparatus to swing to the left, looking forwardly, until it reaches the rib. In order for this swing to take place, the brake devices 391 and 392 will have had the valve 631b of the unit 606 operated to admit fluid through the conduit 492 to force the brake applying pistons back against the action of the springs which normally cause brake application. With the structure shown in Fig. 42, the operator would simply manipulate the control levers for the valves 631s and 631b of the units 605 and 606 at the same time, and when the desired angular position was attained, the valve 631s of the unit 605 would be returned to mid position, and the valve 631b of unit 606 would be manipulated to vent fluid through the conduit 492 and back to the reservoir 615 and then allowed to move into mid position, as shown in Fig. 43. (Note that the valves are automatically self-centering when released.)

Assuming that the disintegrating apparatus was not at proper floor level, the operator would, by means of the valve unit 603, vent fluid through the conduit 569, from the branch connections of conduit 276 leading to the cylinders 267, and allow the disintegrating device to reach the desired bottom position. The fluid would pass freely through the valve mechanism 570 past the check valve 679. When the desired bottom position was reached, the valve 631r of unit 603 would be returned to neutral position. Fluid would then be supplied under the control of the valve 631f of unit 604 to the forward ends of the cylinders 308 through the connection 314, and the cross connection between the cylinders, and the disintegrating mechanism would be sumped in at the bottom of the face. If there was occasion for so doing, the operator would supply fluid through the conduit 407, under control of valve 631bj of unit 608, to the top of the bottom jack 401 to effect a proper angle in altitude of the apparatus so that the sumping would be performed at the desired level to continue the floor. At the end of the sumping operation, the valve 631f of unit 604 would be moved to cut off communication between the supply and the conduit 314. Fluid would then be admitted, under control of valve 631r of unit 603, to the line 569 and pass through the valve mechanism 570 and the branch conduits 276 into the disintegrating device raising cylinders 267, and a vertical band of material would be removed from the face. When the desired height was attained by the front end of the disintegrating device, the valve 672 would be operated automatically as heretofore described and cut off the supply of fluid through the conduit 569, though the operator might not yet have returned the valve 631r of the unit 603 to center position. The operator would then manipulate the valve 631f of the unit 604 in the opposite direction from its central position to admit fluid to the rear ends of the sumping and withdrawing cylinders 308 by way of the conduit 316, and withdrawal at the ceiling or roof would be made, thus completing the removal of a vertical band. When this withdrawing operation was completed, the valve in the unit 604 would be returned to mid position. The brakes would then again be released, and fluid supplied to the cylinder 354 through the conduit 378 under control of the valve 631s of unit 605—desirably after somewhat lowering the disintegrating apparatus to insure freedom of lateral swing—and when the left side of the disintegrating unit reached the right hand vertical wall of mineral left by the completion of the first attack, a new band would be removed by operations similar to those already described, and successive bands would thereafter be removed to the requisite number to complete the width of the face. If, for any reason, it were desired to supply fluid to the roof jack 410, this could be effected under the control of the valve 631tj in unit 609, and if the elevation of the tail conveyor required change, the valve 631c in the unit 610 could be manipulated to admit fluid to the conduit 504 if raising were called for, or to vent fluid through the conduit if lowering were called for. Obviously, whenever all of the valves in the various units are in mid position in the units, the pump 617 is not subjected to any back pressure other than that due to friction in the pipe lines. If it were desired to tram the machine a substantial distance, fluid would be admitted to the cylinder 330 through the conduit 575 under the control of the unit 571. Of course, during mere advance between successive extensions of the face, this would not be done, as it would be desirable to clean up the bottom as the apparatus moved forward the short distance involved. In order that the nose of the main conveyor and the scrolls may work along the bottom, the position of the mechanism 571 would be the same as shown in Fig. 42. If it were desired to lift the nose of the conveyor and the scrolls, fluid would simply be supplied under the control of the valve 631n of the unit 607 through the conduit 577 and shift the automatic control valve to supply fluid through the conduit 575 to the front end of the cylinder 330.

Now that I have described the general operations performed by my improved apparatus hereinabove described, in some detail, an example of a specific series of operations performed by this apparatus may now be useful.

The apparatus illustrated, as will be recalled, has four bit equipped chains. These chains may be such as to provide, for example, seven bit positions on each chain. The bits on successive blocks may be about seven inches apart. The bits are arranged in generally transverse rows with the median lines of the rows spaced apart a distance equal to the pitch of a chain block and with the bits of the individual rows some slightly in advance and some slightly to the rear, as hereinabove described, of said median lines. As illustrated, the bit rows are slightly diagonal, and there is a difference in position, in the direction of orbital movement, of seven-eighths inch (⅞") between each bit and the next one in the row. The ratio between row widths and distances between the median lines of successive rows is not perfectly shown in the drawings of which the small scale did not lend itself to a precise illustration of this subject matter. The chains may have an orbital speed on the order of 550' per minute. The outermost points in the bit orbits at the parallel upper and lower sides of the disintegrating apparatus may be about 20 inches apart, and the radius of curvature of the paths of the outermost bit tips at the curved forward ends of the disintegrating apparatus may be about 10 inches. The depth of penetration of the disintegrating apparatus into the face—midway of its height—may be about 17 inches, of which, calling this 17 inches D, and calling the 10 inch radius of curvature mentioned R, we shall have as $D-R$ a distance of 7 inches, which will be the length of the straight outward travel of the bit tips before emerging from the face when the disintegrating apparatus is approximately horizontal. With this arrangement, it is apparent that only one complete bit row at a time will be disposed within the portion of the bit orbits between the arcuate portion thereof and the face of the vein. It may be noted that this is on the order of the pitch length of one bit carrying chain block. During the last quadrant of upward and outward bit movement, due to the inclination of the bit faces there will be a generally upward and outward pressure applied to the coal during upswing, later described. As has been suggested, the disintegrating apparatus in initiating its attack, in this illustrative example of the use of the apparatus, may be sumped in at the bottom of the face roughly 17", and its upward swing in 7' coal is about 5'. The sumping operation takes about 8 seconds in this illustrative operation. Because of the arrangements of the bits in relatively widely spaced rows, i. e. with relatively wide spacing as compared with the overall widths of the rows transversely to their median lines, there will be provided, as it were, a succession of severing impacts applied by the bits to the coal.

It will be appreciated that the coal in the seam is generally under a very considerable pressure, ranging from a very small pressure, when the seam is near the surface of the ground, to a very high pressure when the seam is a great distance below the surface. There are also other special conditions—as along pillars or along longwall faces— where very high pressures are encountered. In any event, it will be appreciated that when sumping is effected, whether at the top or the bottom of a seam, there will be a very marked change in the internal stresses of the coal above or below the opening formed by sumping, depending on whether that opening is at the bottom or the top of the seam. The column of coal extending from one edge of the seam to the adjacent bounding surface of the sump-produced opening is obviously relieved of pressure, and this occasions marked internal stressing of this column of coal. It seems probable that there is enough change to set up important internal stresses which will leave the coal in a condition to be more easily broken by the cumulative action of the bits as these move either upward and outward or downward and outward in a direction to tear material from the face. If the coal is of a crystalline construction with cubical crystals, conditions will be established which will facilitate detachment between adjacent crystals, and if the coal is simply horizontally stratified and has only horizontal cleats, it is by no means impossible that there will be produced strains in vertical planes which will enable, with the presence of the horizontal cleats, much more ready detachment of chunks of coal of substantial size. The particular point I wish to stress is that, whether the load be removed from the coal by making an initial opening at the bottom or at the top, internal forces will be set up in the portion of the coal that is to be attacked by the bits in the upward or downward swing of the attacking instrument, which will make it much easier to tear off substantial pieces. This condition I provide novel means to utilize to the full, through supplementing the disintegrating stresses by repeated impacts on the coal by the lines of bits and by the forcing of the bits into maximum possible penetration (see Fig. 61), so that their tearing action may be augmented, and by causing a plurality of bits to exert forces on the relatively limited thickness of coal, as they move outwardly, with a resultant reduction in the forces needed to detach the coal because the bonds at the ends (or one end in most cases) will have a plurality of bits cooperating in exerting the force necessary to effect their severance. It is believed that diagonally upward and outward fractures may be facilitated during upward movement of the disintegrating apparatus, bearing in mind particularly the fact that, during a portion of the last quadrant of their upward and outward movement, the forces exerted by the faces of the bits are directed upwardly and outwardly.

Having shown that the sumping operation in a measure readies the coal, in the column at one end of which sumping is performed, for easier detachment, the upswing portion of the attacking cycle may next be considered in some detail. In connection with this portion of the cycle, it should be borne in mind that, if the sumping is at the top of the vein, it may be down swing, and it should be borne in mind also that if, instead of using a swinging attacking instrument, one adjusted as by a parallel link motion were employed, there might be rectilinear bodily up or down movements of the disintegrating instrument.

To effect this next portion of the operation—the upswing—it has been pointed out that it is desirable to apply a swinging force of such magnitude that the attacking instrument will be moved in a given period further than the bits would penetrate by an ordinary cutting operation, but that it is undesirable to have the attacking instrument moved so rapidly that the chains proper will rub on the coal. The complete upswing operation requires about 18 seconds for a 5' upswing. When the upswing operation is completed—I shall revert to this upswing later—a withdrawal operation will be performed, and this will require about 4½ seconds in the illustrative example now being considered. In the example now being considered, the bits have been so set that they have a projection of about 1" from their mountings. It happens that, in the particular example mentioned, the chains were of the so-called "Prox" type and the bits in these chains have about a 1" projection above the abutments on the block, which means, on side-positioned bits, an actual projection in the direction of bit advance of roughly .6 inch, though "center" bits have the full 1" projection. In the illustrative embodiment of the invention conventional cutter bits and cutter chain blocks are shown, as the invention may be practiced with many types of bits.

Now with a chain speed of 550' per minute, during the period of upswing (18 seconds) each chain will travel 165' all told, and, assuming that there is a seven-position chain being employed with each guideway, a bit in each bit position on the chain will emerge from the face about forty times during the period of upswing, and this will mean that a bit, in each of the many positions on the chain, will have, say, forty opportunities to engage the coal, and since these bits have a maximum projection from their settings of 1" they could, if they cut to the full projection of the center bits, cut out only about 40 inches of coal. However the upswing of structure 180 is 60 inches during this period in which even the bits with maximum projection could cut only about 40 inches, and therefore it is very evident that my improved apparatus is giving a rate of removal of coal from the solid during the upswing at least 1½ times as rapid as the bits would actually cut the coal if their action were simply a cutting one. By virtue of the character of the piston structure 265 and the rate and pressure at which fluid is supplied to the cylinders of this structure, as hereinbefore described, it will be clear that the rate of upswing of the bar structure will substantially constantly greatly exceed the maximum upswing possible if the coal were removed by a simple cutting action. It is therefore evident that my claims to a tearing action, as distinguished from a cutting action, are well founded, for, with a conventional cutting action, the total upward movement of the bar gang in the 18 seconds actually required for a 5' upswing would be only 40" at the portion of the bar immediately to the rear of the curved forward portion of the bar gang, if a full one-inch projection existed for all bits, which is by no means the case for the side bits. This increased rate of coal removal I believe to be explained by the fact that the $D-R$ distance above mentioned is so relatively short that much of the detaching action of the coal is not in the form of a cutting action which causes the coal to break out inwardly towards the free top face of the kerf, but to be broken off towards the free face of the seam, and these results are further verified by the fact that with my invention the percentage of "over 1" " coal is 36% to 40%, and the percentage of "over 2" " coal is 18% to 22%, conditions which would not occur, even were it possible to perform a normal cutting operation, with a 1" projection of the center bits; and the actual normal penetration of bits in ordinary kerf cutting only runs on the order of ½", being kept down by the reduced penetration of the side bits. The upswing time is definitely reduced by the detachment periodically of chunks of substantial size due to the fact that the increased areas of bit contact with the coal and the short distance $D-R$ may enable the bits to operate to break out chunks of coal larger than would be detached by single bits with normal penetration. The factor of increased area of contact produced by the forcing of the bits a greater distance into the coal cannot be overlooked, for when the area of a bit's contact with the coal in a plane more or less perpendicular to the direction in which a lump of coal can be broken out, multiplied by the bearing strength of the coal, exceeds the sum of the forces necessary to free the bonds of a lump to the seam, then that lump will be torn out.

While I do not wish to be restricted to this theory of operation, it is my opinion that the completion of the upswing in a period so much shorter than would ordinarily occur if the coal were simply being cut out in accordance with normal cutting conditions—during which period the penetration of the individual bits would probably be on the order of ½", instead of the observed mean coal removal of 1½" on the average for each action of each bit on the coal, is possible because (a) no central bits will cut less than their full projection if there is coal ahead of them to cut; (b) because some bits, as when the coal is partially fractured by the action of one or more preceding bits, may break and tear out the coal without any cutting action at all, (c) because the periodic attacks by the transverse rows of bits will augment the disintegrating action by weakening the coal, and (d) because at times, and especially in the upper positions of the bar, where the bits are working towards an overhanging lip of coal, that there will frequently be dislodged blocks of coal a plurality of chain widths in lateral length. Frequently lumps of coal actually come out so large as to necessitate the presence of the breakers, and occasionally where the large lumps may escape to the floor and be picked up, or may get past the breakers endwise without sufficient fracture, there may even be momentarily a stalling of the primary conveyor until the coal is broken up. Thus I have an action with my improved apparatus quite different from that of the prior art, and the combination of a relatively short $D-R$ distance, plus an internal stressing of the coal in the columns at the ends of which sumping is performed, plus a force adequate fully to utilize the potential penetration of the bits gives a combination of a reduction in maximum breaking forces requisite to detachment of the coal and of increases in pulling or tearing action as distinguished from cutting action, sufficient to break or tear out a very substantial amount of coal rather than to have the bits cut out all of the coal as their primary mode of operation.

While the values given in the illustrative example are actual and have been found to be satisfactory under a particular condition of service, it is to be understood that these values may be varied not only to meet the requirements of different bodies of coal but also under any given conditions of service to obtain like results by effecting complementary changes in involved factors upon change in other factors.

Figs. 51 to 55 show a modified arrangement for the control of the horizontal swing and brake mechanisms whereby the brakes for the turntable may be continuously applied except when fluid is to be admitted to one or the other of the swing cylinders to effect turntable swing. In order that more room may be available, the valve blocks 605 and 606 are spaced slightly by means of a spacer block 701, which is provided with a series of through passages to connect the supply conduits 643, 644, the exhaust conduits 627, 628, and the passages 658 and 656. The structure of the swing control valve is unchanged, but there is a common support shaft 702 for the pivot sleeves 703 and 704 of the operating levers 705 and 706 of the swing control valve 631s and of the brake control valve 631b'. The shaft 702 is supported by support members 707 and 708 mounted on the valve blocks. The brake control valve 631b' is modified by grooving its spool 633' as at 709, so that in the central position of said valve the line 492 leading to the brake cylinders is constantly vented. Also, a stop 710 is provided to limit the direction of movement of said valve from its mid position to "inward." The stems 711 and 712 of the swing and brake control mechanisms are connected to their operating levers 705 and 706 respectively. The pivot sleeve 703 of the lever 705 has a projecting lug 716 which is received in a slot 717 in the pivot sleeve 704 of the lever 706. This lug and slot arrangement is such that when the swing control valve is moved inwardly, the lug 716, which is at the top side of the sleeve 703, will, through the sleeve 704, cause the valve 631b' which controls the brake to move inward and thereby cause fluid to be supplied to the cylinders of the brake devices 391 and 392 and release the brakes, while swing of the turntable in a clockwise direction will take place. The length of the slot 717 will be such that the opposite movement of the operating lever 705 will not cause the lug 716 to move the sleeve 704 in a direction to tend to move the brake control valve outward. On the other hand, by the provision of a support 720 projecting from the intermediate block 701 and a lever 721 pivoted on said support and having a pin and slot connection 722 with the valve stem 712, and having a portion 723 adapted to be engaged by a pin 724 on the valve stem 711 as the latter stem is moved outwardly, the brake control valve will be caused to move inward and cause a release of the brakes by the supply of fluid to the conduit 492 whenever the valve 631s is operated to supply fluid to the cylinder 353 to effect counterclockwise swing of the turntable. Thus, regardless of which of the cylinders 353 or 354 is to be supplied with fluid to effect turntable swing, there will be pressure supplied to the brake control cylinders to release the brakes, and, whenever the supply of fluid is cut off from the swing cylinders, the fluid will be released from the cylinders of the brake devices 391 and 392 and the springs 395 will effect brake application. The unilateral engagement of the lever portion 723 with the pin 724 precludes this pin from effecting operation of the brake control valve when the swing control valve is moved inwardly.

Another desirable arrangement for securing coordinated control of the swing and brake cylinders is shown in Figs. 56 to 59. Except for the fact that the brake control valve 631b'' is prevented from inward movement by a suitable stop pin 726, and that the grooving 709' of the end spool of the valve is at the outer rather than the inner end spool, and that this spool is slightly shortened to compensate for the reduced range of valve movement, and that conduit 492' leads to the outer groove 644, rather than the inner one, the arrangement, aside from the valve operating mechanism, now to be described, is the same as in Fig. 51. The valve operating mechanism of the arrangement of Figs. 56 to 59 includes support elements 707' and 708' substantially similar to the corresponding ones of Fig. 51. The shaft 702' is similar and similarly located, though a little higher. The valve operating rod 712' of the brake control valve has an upstanding arm 727 mounted on it, and this carries a laterally extending rod or pin portion 728 having a reduced end 729 which passes through slots 730 and 731 in links 732 and 733 respectively which are pivotally connected respectively to an upward extension 734 of the operating lever 705' for the swing control valve, and to said operating lever 705' at a like distance below its pivot, as at 735. The links cannot escape from the reduced end because a nut and washer arrangement 736 is carried by said end. It will be evident that whichever direction the lever 705' which controls the swing control valve is moved, there will be caused an outward movement of the brake control valve 631b'', and so the brakes will be released each time the swing cylinders are supplied with fluid under pressure and permitted to be reapplied by the springs each time fluid is cut off from the swing cylinders.

While I have shown and described a turntable brake mechanism with various controls therefor in association with the swing cylinders for control of the turntable and its supported parts, it is to be borne in mind that under conditions where maximum rigidity of the machine in operation is not necessary the brake mechanism and the control therefor may be omitted and reliance placed wholly on the entrapping of fluid in the swing cylinders to hold the turntable against undesired movement.

*The control for the disintegrating mechanism driving motor*

Figure 46:
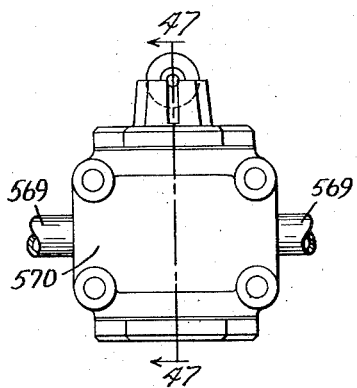
Fig. 46 is an elevational view showing a valve forming a portion of the control for the devices for raising the disintegrating mechanism.
Figure 47:
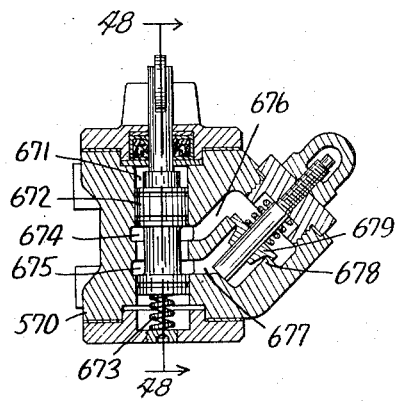
Fig. 47 is a vertical section on the plane of the line 47—47 of Fig. 46.
Figure 48:
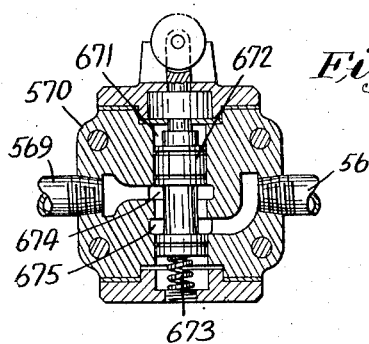
Fig. 48 is a vertical section on the plane of the line 48—48 of Fig. 47.
Figure 34:
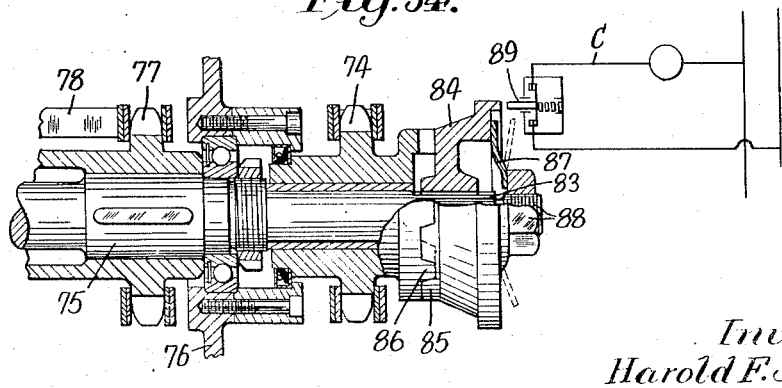
Fig. 34 is an enlarged fragmentary transverse vertical sectional view on the plane of the line 34—34 of Fig. 3, showing the safety clutch in the main conveyor drive, and the electrical safety device controlled thereby.

While it is unnecessary for the purpose of this case, a motor control suited to cooperation with the mechanism shown in Fig. 34 is illustrated in Fig. 60. Here it will be noted that the line 751 is adapted to be connected by a line contactor or switch 752 with an overload relay coil 753 which is connected by a conductor 754 to the starting resistance 755, which consists of two portions: 755', first cut out, and 755'', cut out in a second step. The other end of the starting resistance is connected by a conductor 756 with the armature A of the motor 25, and the other side of the armature A is connected by a conductor 758 with the series field 759 of the motor 25. A conductor 762 leads from this series field to a second line contactor or switch 763 connected with the other power line 764. The shunt field 765 of the motor is connected by conductors 766 and 767 respectively with the conductor 754 and the conductor 762. The line switch 752 has an operating coil 769. A suitably fuse controlled conductor 770 and another suitably fuse controlled conductor 771 constitute portions of a control circuit extending between the lines 751 and 764. The line switch 763 has an operating coil 773 and also has movable with it a normally closed contact element 774 and a normally open contact element 775. For the purpose of cutting out the section 755′ of the starting resistance a normally closed accelerating contactor or switch element 776 is provided, having movable with it two normally open control circuit contact elements 777 and 778. An accelerating contact or switch 779 is provided for controlling the cutting out of the starting resistance section 755″, and has movable with it a single normally open control circuit contact element 780. The accelerating switch elements 776 and 779 are each controlled by two windings, a main winding and a neutralizing winding. The main winding controlling the switch element 776 is designated 781 and the neutralizing winding 782. The main winding for operating the accelerating switch element 779 is designated 783 and the neutralizing winding is designated 784. An overload relay switch 785 controlled by the overload relay switch coil 753 is provided. A normally closed stop switch 787 is provided, and a normally open starting switch 788. A pilot switch 789 controlled by the clutch in the main conveyor drive is also provided. A relatively high resistance is provided at 790.

It should be understood that the main windings and the neutralizing windings are so connected that the magnetism created by a main winding is opposed by that created by the associated neutralizing winding. When current flows in a main winding, the resulting magnetism pulls the armature (791 associated with switch 776, 792 associated with switch 779) against the spring pressure provided by one or the other of the springs 793 and 794, and opens the associated accelerating or starting resistance controlling switch. The construction is such that enough magnetism will be retained after current ceases to flow in the main winding to hold the armature "in," that is, in switch opening position, indefinitely. The neutralizing winding is very weak compared with the main winding, but, when current flows through it, its magnetism slowly decreases the residual magnetism left by the main winding, at a definite rate until the armature is moved to its normal or "out" position by the spring. When the motor is started, current flows continuously through the neutralizing windings, but through the main windings only when it is desired to operate the contactors; and the main winding is strong enough to pull the armature "in"—to open the accelerating or resistance controlling switch element—even though opposed by the neutralizing winding. The length of time required for the armature to return to its normal position after the current ceases to flow through the main winding is fixed by the value of the neutralizing current. An iron core, not shown, is provided to cooperate with the armature when the latter has been moved "in" by the main winding.

Upon the closing of the starting switch element 788, current will flow through the conductor 770, the stop switch 787, the starting switch 788, the main winding 781 associated with the accelerating switch element 776, the normally closed contact 774 associated with the starting switch 763, and to the negative line 771. This energizes the main winding 781, which pulls the armature 791 to the "in" position, opening the switch element 776 and closing the contacts 777, and 778. Closing of contact 777 will allow current to flow through the main winding 783 associated with the switch element 779. The magnetism created by current flow through the winding 783 pulls the armature 792 to "in" position, opens the switch 779, and closes the switch 780. With switches 776 and 779 both open, the starting resistance 755 will all be in the power circuit when the latter is completed, as shortly described. Since the control contacts 777 and 778 are both closed and also the control contact 780, current can flow through the line contactor coils 769 and 773 and also the accelerating contactor neutralizing windings 782 and 784. The line contactor coils close the line contactors or switches 752 and 763, and start the motor with the full starting resistance "in." Closing of the switch 763 closes the control contact 775, shunting the starting switch 788 so that the latter may be released. It also shunts the switch elements 777, 778 and 780. It also opens the normally closed switch element 774 and so interrupts current flow through the main winding 781, controlling the position of the accelerating contact 776. All of the operations described are practically instantaneous after the start switch 788 is closed. When current ceases to flow in the main winding 781, due to the opening of control contact 774, the time delay feature above mentioned commences to function. The residual magnetism which remains after energization of the main winding 781 is interrupted, is weakened by the energization of the neutralizing winding 782 until the force exerted by the spring 793 closes the accelerating contactor 776, cutting out part of the starting resistance and moving the control contacts 777 and 778 to open position. This results in interrupting current flow through the main winding 783 associated with the accelerating contact 779, and after the time delay interval switch 779 returns to its normal closed position, cutting out the remainder of the starting resistance. The motor is now directly across the line, after being accelerated through two steps of resistance. When the stop switch 787 is opened, the holding circuit for the coil 769 and 773 is broken and these contactors drop out, returning the apparatus to its normal position. Obviously, also, opening of the clutch control switch 789 will have the same effect as the opening of the stop switch 787, since these are in series, and, accordingly, the motor 25 will be stopped if the clutch in the drive for the main conveyor 78 is thrown out due to jamming of the main conveyor.

It is unnecessary to go into further detail with respect to this motor circuit for the purposes of this application, and the control for the motor 30 which drives the main conveyor 78, the pump 617, the crawlers, etc., need not be described, as it may be of any suitable type, such as the one described for the motor 25.

*Mode of operation*

There would appear to be little need for a general description of the mode of operation of the apparatus shown in view of what has been said, but in Figs. 49 and 50 I have provided operating diagrams, the first in the form of a top view and the second in the form of a side elevation, showing the functioning of the apparatus.

By means of the crawlers, the apparatus will be moved into the place where work is to be performed, and during the transit of the apparatus, the nose of the main conveyor and the scrolls will be lifted out of contact with the bottom. Where the work is to be performed in a relatively narrow compartment, as for example, in an entry, the apparatus will be moved along the center line of the mine chamber and brought up to a position in which the forward end of the disintegrating device, when in horizontal position, will be substantially at the face. The disintegrating device will then be moved to adjacency to the rib at which the initial operation in crossing the face is to be performed—say the left hand rib; and, the disintegrating device having been brought down to the level of the bottom, and the floor jack at the rear end of the apparatus having, when circumstances so indicate, been supplied with fluid under pressure to maintain the distintegrating device at the desired height at its forward end, a sumping operation will be performed by feeding the disintegrating apparatus radially of the turntable.

During sumping to the requisite depth—a depth normally determined by the effective length of the sumping and withdrawing cylinders—the brake devices, which will have been released during the lateral swinging of the disintegrating apparatus, will hold the turntable against rotation; and these brake devices will continue to function during the ensuing upward swing of the disintegrating apparatus by the lifting cylinders to such a point as may have been determined for the desired roof height. After this, noting that this height may be automatically controlled, a withdrawing operation may be performed, and the disintegrating apparatus may be moved outwardly and clear away the small depending angular shaped mass of coal at the roof between the top position of the disintegrating apparatus at the end of the upward swinging movement thereof and the level of the roof outside the face. After one vertical band has been removed, the turntable brakes will be released, the disintegrating apparatus turned, clockwise in the case assumed, through the necessary angle to position it for an attack on the next adjacent vertical course of coal; and, after the disintegrating device is lowered, the operations of sumping, upward swinging, and withdrawal will be repeated. This will be continued in successive steps until a "layer" the full width of the face has been removed, and then, after the jack or jacks are released, the apparatus will be moved forward a short distance—something less than the potential sumping feed—and the next section of the face removed in similar steps. It will be observed that the face will be arcuate in horizontal section and arcuate in vertical section, and that the operations can be performed with great rapidity. The roof jack may supplement the action of the floor jack in locking the parts, as during sumping, and may also be used, when desired, to effect and adjustment in altitude not practicable with the floor jack, which can raise the rearward end of the apparatus but not force it down.

Substantially all of the material detached and disintegrated by the operation of the disintegrating apparatus will be carried rearwardly and dumped through the hood and through the turntable onto the main conveyor, and be delivered at the rear of the latter either onto a suitable material-handling apparatus or, where a tail conveyor is used, onto the latter; and the tail conveyor may be adjusted vertically at its rear end and also horizontally at its rear end—vertically by power and horizontally manually—so as to permit the discharge of the mined material to a conveyor, or to a shuttle car, or to any other apparatus which may be used for the expeditious handling of the large production of coal or other mineral by the apparatus which forms the subject of this application.

The bottom will be normally cleared of coal in advance of the apparatus, as the same moves forward; the material directly in front of the main conveyor being picked up by the forward end of the latter; the material in front of the crawlers being moved by the inner scrolls laterally and then handled by the main conveyor; and the loose material between the sides of the crawlers and the ribs will be picked up by the yieldably mounted side scroll sections and their associated plates and moved into the zone of operation of the inner scrolls and then conveyed by these latter to the main conveyor.

The disintegrating apparatus moves the coal between its side boards and discharges it into the hood. Any large lumps will be ordinarily broken up by the breaker devices, but if a lump of sufficient size gets past these breaker devices and jams the main conveyor, the automatic stop for the motor 25 for the disintegrating device will immediately cause the further supply of coal from the face to the then-inoperative conveyor system to be interrupted. As soon as the main conveyor is cleared again, the drive of the motor for the disintegrating device may again be started and operations resumed.

When it is desired to turn off at an angle, the face disintegration may be confined to one side or the other of the chamber, and as the angle of the crawlers to the face is changed, an entry may be turned off very quickly.

Substantially all of the coal or other mineral brought back from the face will be delivered to the hood, will pass through the turntable, and will be delivered by the main conveyor at the rear end of the latter or at such other point as its exit may be provided for.

Because of the upward operation of the disintegrating apparatus, it will be enabled to collect nearly all of the material disintegrated from the vein. Because of the width of the band mined out at any time, the number of vertical courses having to be made in any mine chamber before the apparatus will be moved forward to a new position will not be large. Because of the construction in which the turntable is enabled to receive at all times the material brought back by the disintegrating apparatus and to discharge it onto the main conveyor, there will be very little occasion for shoveling, particularly since the scrolls and the forward end of the main conveyor will keep the floor practically clean both in front of and at the sides of the apparatus. It is evident that since the apparatus which embodies the illustrative embodiment of the invention (and various modifications thereof) will be clearly understood without more extended description, nothing more needs to be said as to operation.

It is evident that the invention provides a very effective apparatus for mining coal from the solid. It is, moreover, evident that the apparatus is well adapted to the performance of all of the functions which have been described; that it is capable of meeting substantially any conditions likely to be encountered; that its rate of production is high, and that its construction is such that little time might be lost due to breakage. It is, moreover, evident that the apparatus is adequately protected against damage. The other advantages inherent in the apparatus which it may be used to practice need not be catalogued here.

While I have in this application specifically described one form and certain modifications of the invention, it will be understood that these are shown and described for purposes of illustration only, and that the invention may be further modified without departing from its spirit or the scope of the appended claims.

What I claim as new and desire to secure by Letters Patent is:

1. In an apparatus of the character described, a pivotally mounted disintegrating apparatus for disintegrating the mineral of a solid vein and having a horizontal pivot near its rearward end, hydraulic cylinder and piston elements relatively movable to effect swinging of said disintegrating apparatus upwardly about its pivot and for at will holding the same in adjusted position or allowing its downward swinging, means controlled by the relative movement between said cylinder and piston elements for cushioning the downward movement of said disintegrating apparatus during the latter part of such movement and means including a stationary abutment and an adjustable abutment mounted for swinging movement with said disintegrating apparatus for positively limiting the downward swinging movement of said disintegrating apparatus after retardation of its downward swing by cushioning.

2. In combination, a disintegrating device swingable about a transverse axis and comprising vein-attacking elements guided for movement in closed orbits and spaced to subject a portion of a vein to a continuous disintegrating action over a relatively wide area, a hood for receiving disintegrated material brought back by said vein-attacking elements and having an adjustable upper portion, also movable about a transverse axis, to accommodate it to different limits of disintegrating device swing, and a plurality of breaker elements extending radially inwardly from said adjustable upper portion towards and in line with the orbits of said vein-attacking elements and cooperating with the latter in breaking up large fragments of mineral detached from the mine vein.

3. In an apparatus for mining from the solid, mineral disintegrating apparatus comprising a gang of chains circulating in parallel, contiguous, vertical orbits and means providing guideways for said chains, a hood enclosing and partially overlying the rearward portion of said disintegrating apparatus for receiving mineral detached from the solid by said gang of chains and having a discharge opening elongated in a direction transversely of said gang of chains and comparatively narrow in the direction in which the planes of said chain-guideways extend and a further discharge opening in advance of said narrow opening, a turntable supporting said disintegrating apparatus and also having a discharge opening and further having an upper portion providing a hopper-like space with which said narrow opening and said forward opening both communicate, means for supporting said disintegrating apparatus for reciprocation radially relative to said turntable, and means for reciprocating said supporting means between such limits that said narrow opening at all times remains within the compass of the top of said hopper-like space providing portion, said further opening moving in advance of said hopper-like space providing portion when said supporting means is in its outer position, said turntable element having its bottom discharge opening of lesser area than the area encompassed by the top of said hopper-like space providing portion, and a conveyor structure underlying the full area of said turntable-discharge-opening, said turntable having a portion in advance of said hopper-like space providing portion for directing the disintegrated mineral from said further opening toward said conveyor structure when said further opening is in advance of said hopper-like space providing portion.

4. In an apparatus for disintegrating mineral from a solid mine vein, a movable frame, a disintegrating bar mounted on said frame and having guided for circulation about its periphery more than two chains each carrying longitudinally spaced bits so projecting therefrom that the outer ends of the bits are in various lateral positions in relation to their respective chains, a plurality of bits on each chain being disposed in corresponding lateral positions, said bits on the several chains being arranged in transversely extending rows, the outer ends of the bits being carried for circulation in orbits each of which has a forwardmost portion that is substantially arcuate and each of which includes another portion between its arcuate portion and the face of the vein in the course of the disintegration of the latter, along which other portion the bits move from within the vein outwardly towards the face, means for moving said frame to position within the vein only one complete bit row at a time in said second mentioned portions of the orbits, and power means for moving said bar to feed said bits along a section of the mineral face and to cause the bits to penetrate deeply into the mineral and for circulating said bits in their orbits, said power means being so constructed and arranged that circulation of said bits in their orbits and such feeding movement of said bar will automatically take place at related rates such that said bar is so advanced along the mineral that its instantaneous rate at substantially all times is materially faster than would be possible if said bits simply removed the mineral by a cutting action.

5. In an apparatus for disintegrating mineral from a solid mine vein, a movable frame, a disintegrating bar pivotally mounted on said frame for swinging on a horizontal axis perpendicular to the path of movement of said frame, said bar having guided for circulation about its periphery more than two chains each carrying longitudinally spaced bits so projecting therefrom that the outer ends of the bits are in various lateral positions on their respective chains, a plurality of bits on each chain being disposed in corresponding lateral positions, said bits on the several chains being arranged in transversely extending rows and being guided for circulation in upright planes in orbits each of which has a forwardmost portion that is substantially arcuate and each of which includes another portion between its arcuate portion and the face of the vein at the end of a sumping operation along which other portion the bits move from within the vein outwardly towards the face, means for moving said frame to sump said bar into the mineral, and power means so constructed and arranged as to effect circulation of said bits in their orbits and swinging movement of said bar automatically at related rates such that when said bar is sumped a limited distance to position only one complete bit row at a time within said second mentioned portion of the orbits said bar is swung much faster at substantially all times throughout its range of swing than would be possible if said bits simply removed the mineral by a cutting action.

6. An apparatus for disintegrating a vertical band of mineral from the face of a solid vein through operations which include at least sumping the forward end of a disintegrating bar structure into the face at one end of such a band to form a recess at such end and then removing by at least partly tearing out the mineral of the vein from said recess to points adjacent the other end of the band, which apparatus includes a movable frame, a disintegrating bar structure, means for pivotally mounting said bar structure for swinging in a vertical plane on an axis transverse to the path of movement of said frame, means for moving said frame to sump the forward end of said bar structure into the face, means on said disintegrating bar structure supporting for movement in orbits in vertical planes extending longitudinally of said bar structure a plurality of series of projecting vein-attacking elements, each series having elements in various positions transversely of said bar structure and each including elements at longitudinally spaced points in their respective orbits in corresponding positions on their supporting means, motor operated means for driving said elements in said orbits, and motor operated mechanism constructed and arranged to swing said bar structure at a speed which is automatically coordinated with the rate of orbital movement of said elements to effect a swinging of the forward end of the bar structure materially faster substantially constantly throughout its movement, than would be possible if said elements simply removed the mineral by a cutting action.

7. In an apparatus for disintegrating mineral from a solid mine vein, a movable frame, a disintegrating bar pivotally mounted on said frame for swinging on a horizontal axis perpendicular to the path of movement of said frame, said bar having supported thereon for movement relative thereto a plurality of series of projecting orbitally moving bits, each series having bits in various positions transversely of said bar and including bits at longitudinally spaced points in their respective orbits in corresponding positions on said disintegrating bar, said bits being disposed in rows extending transversely of said bar and each row successively moving on said bar in a direction outwardly towards and generally normal to the face, means for moving said frame to sump said bar a limited distance into the mineral, and means for moving said bits orbitally relative to said bar and for swinging said bar to effect vertical disintegration thereby, said last mentioned means being so constructed and arranged as to automatically coordinate the rates of orbital movement of said bits and swinging movement of said bar so that when the bar is so sumped into the face the forward end of said bar is swung within the mineral materially faster substantially constantly throughout its movement, than would be possible if said bits simply removed the mineral by a cutting action.

8. An apparatus for disintegrating a vertical band of mineral from the face of a solid vein which includes a frame movable along the mine floor toward the face, a disintegrating head structure, means for pivotally mounting said head structure on said frame for swinging movement on a horizontal axis transverse to the path of movement of said frame, means for moving said frame to sump said head structure into the face, means movable on said disintegrating head structure supporting for movement in orbits in vertical planes extending longitudinally of said head structure a plurality of series of projecting vein-attacking elements the outer ends of which are in various positions transversely of said head structure, each series of elements including a plurality of elements disposed in the same orbit on their supporting means, motor operated means for driving said supporting means to move said elements in said orbits, and motor operated mechanism for swinging said head structure, said motor operated means and mechanism being so constructed and arranged as to move said elements and swing said head structure at automatically coordinated rates such that the forward end of said head structure is so moved that its instantaneous rate at substantially all times is materially faster than would be possible if said elements simply removed the mineral by a cutting action.

9. In combination, a mineral attacking instrument including a plurality of bit-carrying elements, bits mounted on said elements for movement along a plurality of orbital paths all parallel to a single plane in the region in which the bits attack the mineral, said bits being so arranged in transverse rows that the bits could cumulatively effect removal of all of the mineral between the outermost orbital paths if they were so moved as to perform a simple cutting action, means for supporting said mineral attacking instrument for pivotal movement about an axis perpendicular to said plane and for rectilinear movement generally horizontally towards a mineral face, said orbits having arcuate portions at their forward ends, means for sumping said instrument into a mineral face to an automatically predetermined depth so limited that the rectilinear distance from the uppermost point in each of said arcuate portions out to the face along said orbits does not materially exceed the mean distance between successive bit rows, and means for moving said bits in their orbits and for swinging said instrument so constructed and arranged that said orbital bit movement and the swinging of said instrument take place at automatically coordinated rates, such that the rate of upward advance of said instrument at its intersection with the face is materially faster substantially constantly throughout its movement, than would be possible if said bits simply removed the mineral by a cutting action.

10. In an apparatus for disintegrating mineral from a solid mine vein, a movable frame, a disintegrating bar pivotally mounted on said frame for swinging on a horizontal axis perpendicular to the path of movement of said frame, said bar having thereon several series of projecting orbitally moving disintegrating elements, each of said series having repetitive arrangements of said disintegrating elements in various positions laterally of said bar, said elements of the several series being disposed in rows extending transversely of the bar, means for sumping said bar a limited distance through the mineral face, power operated means automatically operative on power supply thereto to provide orbital movement of said disintegrating elements at a predetermined substantially constant rate when the orbital movement of said elements is opposed by a substantially constant resistance, and power operated means automatically operative on power supply thereto to effect swinging shearing movement of said bar at a predetermined substantially constant angular rate when the resistance to shearing is substantially constant, said rates being automatically coordinated so that shearing takes place materially faster substantially constantly throughout its movement, than would be possible if said elements simply removed the mineral by a cutting action.

11. In an apparatus for disintegrating mineral from a solid mine vein, a movable frame, a disintegrating bar mounted on said frame and having mounted thereon for circulation relative thereto in orbits having their forward portions disposed in planes extending longitudinally of said bar, a plurality of series of variously laterally positioned projecting bits, and power means constructed and arranged to effect circulation of said bits in their orbits and feeding advance of said bar through the mineral, in a direction parallel with the planes of the forward portions of said orbits and transverse to the length of the bar, at automatically coordinated rates to so advance the forward portions of said orbits that their instantaneous rate of advance at substantially all times is materially faster than would be possible if said bits simply removed the mineral by a cutting action.

12. In an apparatus for disintegrating mineral from a solid mine vein, a movable frame, a disintegrating bar mounted on said frame and having guided for circulation about its periphery more than two chains each carrying longitudinally spaced bits so projecting therefrom that the outer ends of the bits are in various lateral positions in relation to their respective chains, a plurality of bits on each chain being disposed in corresponding lateral positions, said chains providing transversely extending rows of bits carried for circulation in orbits each of which has a forwardmost portion that is substantially arcuate and each of which includes another portion between its arcuate portion and the face of the vein in the course of disintegrating the latter, along which other portion the bits move from within the vein outwardly towards the face, the longitudinal spacing of the bits on said more than two chains being alike, a power driven shaft, a series of like circular sprockets, one for each chain, mounted on said shaft and arranged to be driven thereby and supporting and driving said chains, the teeth of successive sprockets along said shaft being progressively set back by like increments in relation to those on the preceding sprocket so that the bits on said more than two chains as they are moved along said bar travel in rows which are parallel to each other and oblique to the length of the bar, means for moving said bar to feed said bits along a section of the mineral face, and power means constructed and arranged for driving said shaft, to effect circulation of said bits in their orbits, and for effecting such feeding movement of said bar at automatically coordinated rates such that when said bits are advanced along the mineral with only one complete bit row at a time within said second mentioned portions of the orbits said bar will be so fed that its instantaneous rate at substantially all times is materially faster than would be possible if said bits simply removed the mineral by a cutting action.

13. An apparatus for disintegrating a vertical band of mineral from the face of a solid vein through operations which include at least sumping the forward end of a disintegrating bar structure into the face at one end of such a band to form a recess at such end and then removing by at least partly tearing out the mineral of the vein from said recess to points adjacent the other end of the band, which apparatus includes a movable frame, a disintegrating bar structure, means for moving said frame to sump the forward end of said bar structure into the face, means on said disintegrating bar structure supporting a plurality of vein attacking elements in various positions transversely of said bar structure, motor means for circulating said elements in transversely spaced orbits and motor operated mechanism constructed and arranged to feed said bar structure, from its sumped position, along a section of the mineral face at a speed which is automatically coordinated with the rate of orbital movement of said elements to effect a movement of the forward end of the bar structure materially faster at substantially all times throughout its range of movement than would be possible if said elements simply removed the mineral by a cutting action.

(References on following page)

References Cited in the file of this patent

UNITED STATES PATENTS

| Number | Name | Date |
|---|---|---|
| 845,827 | Steedman | Mar. 5, 1907 |
| 884,960 | Suiter | Apr. 14, 1908 |
| 1,011,928 | Eavenson et al. | Dec. 19, 1911 |
| 1,011,995 | O'Toole | Dec. 19, 1911 |
| 1,143,897 | Flexner et al. | June 22, 1915 |
| 1,361,904 | Rhodes | Dec. 14, 1920 |
| 1,469,132 | Wilson | Sept. 25, 1923 |
| 1,508,634 | Wilson | Sept. 16, 1924 |
| 1,549,699 | Wilson | Aug. 11, 1925 |
| 1,549,700 | Wilson | Aug. 11, 1925 |
| 1,570,829 | Forsyth | Jan. 26, 1926 |
| 1,635,780 | Cartlidge | July 12, 1927 |
| 1,790,057 | Morgan | Jan. 27, 1931 |
| 1,839,625 | Whaley | Jan. 5, 1932 |
| 1,867,853 | Levin | July 19, 1932 |
| 1,873,008 | Miller | Aug. 23, 1932 |
| 1,908,434 | Madeira | May 9, 1933 |
| 1,941,007 | Holmes | Dec. 26, 1933 |
| 1,998,294 | Thomas et al. | Apr. 16, 1935 |
| 2,025,306 | Pray | Dec. 24, 1935 |
| 2,030,063 | Halleck | Feb. 11, 1936 |
| 2,034,492 | Sloane | Mar. 17, 1936 |
| 2,082,119 | Pray | June 1, 1937 |
| 2,180,359 | Joy | Nov. 21, 1939 |
| 2,214,805 | Baker | Sept. 17, 1940 |
| 2,216,177 | Arentzen | Oct. 1, 1940 |
| 2,269,781 | Osgood | Jan. 13, 1942 |
| 2,287,230 | Cartlidge | June 23, 1942 |
| 2,372,130 | Smith | Mar. 20, 1945 |
| 2,384,447 | Baldwin et al. | Sept. 11, 1945 |
| 2,410,012 | Churchman | Oct. 29, 1946 |

FOREIGN PATENTS

| Number | Country | Date |
|---|---|---|
| 316,292 | Germany | Nov. 24, 1919 |
| 566,777 | Germany | Dec. 21, 1932 |
| 626,773 | Germany | Mar. 2, 1936 |